United States Patent
Ko

(10) Patent No.: US 9,146,155 B2
(45) Date of Patent: Sep. 29, 2015

(54) OPTICAL SYSTEM AND MANUFACTURING METHOD THEREOF

(75) Inventor: Cheng-Hao Ko, Zhudong Township, Hsinchu County (TW)

(73) Assignee: OtO Photonics, Inc. (TW)

( * ) Notice: Subject to any disclaimer, the term of this patent is extended or adjusted under 35 U.S.C. 154(b) by 380 days.

(21) Appl. No.: 12/966,083

(22) Filed: Dec. 13, 2010

(65) Prior Publication Data

US 2011/0080584 A1  Apr. 7, 2011

Related U.S. Application Data

(63) Continuation-in-part of application No. 12/045,836, filed on Mar. 11, 2008, now abandoned, and a continuation-in-part of application No. 12/180,567, filed on Jul. 28, 2008, now abandoned.

(30) Foreign Application Priority Data

Mar. 15, 2007 (TW) ............................. 96109036 A
Aug. 3, 2007 (TW) ............................. 96128494 A

(51) Int. Cl.
    *G01J 3/28* (2006.01)
    *G01J 3/02* (2006.01)
    *G01J 3/18* (2006.01)
    *G01J 3/20* (2006.01)
    *G01J 3/24* (2006.01)
    *G02B 5/18* (2006.01)

(52) U.S. Cl.
    CPC .............. *G01J 3/02* (2013.01); *G01J 3/0218* (2013.01); *G01J 3/0291* (2013.01); *G01J 3/1804* (2013.01); *G01J 3/1838* (2013.01); *G01J 3/20* (2013.01); *G01J 3/24* (2013.01); *G02B 5/1861* (2013.01)

(58) Field of Classification Search
    USPC .................................................. 356/326–328
    See application file for complete search history.

(56) References Cited

U.S. PATENT DOCUMENTS

| | | | |
|---|---|---|---|
| 4,695,132 A | 9/1987 | Sakuma | |
| 4,770,517 A | 9/1988 | Sakuma | |
| 4,936,684 A | 6/1990 | Keane | |
| 5,550,375 A * | 8/1996 | Peters et al. | 250/343 |
| 5,615,008 A | 3/1997 | Stachelek | |
| 5,719,672 A * | 2/1998 | Chien | 356/328 |
| 5,734,165 A | 3/1998 | Unal et al. | |
| 5,859,702 A | 1/1999 | Lindblom | |
| 6,005,661 A | 12/1999 | Machler | |
| 6,125,223 A * | 9/2000 | Drozdowicz | 385/37 |
| 6,266,140 B1 | 7/2001 | Xiang et al. | |
| 6,650,413 B2 * | 11/2003 | Thibault et al. | 356/328 |
| 6,879,395 B2 | 4/2005 | Oka et al. | |
| 7,595,877 B2 * | 9/2009 | Vakhshoori et al. | 356/328 |
| 7,671,986 B2 * | 3/2010 | Yao | 356/326 |
| 7,701,574 B2 | 4/2010 | Johansen et al. | |

(Continued)

*Primary Examiner* — Tarifur Chowdhury
*Assistant Examiner* — Isiaka Akanbi
(74) *Attorney, Agent, or Firm* — Han IP Corporation; Andy M. Han

(57) ABSTRACT

The invention concerns an optical system. The optical system comprises an input for receiving an optical signal, a predetermined output plane, and a diffraction grating for separating the optical signal received at the input into spectral elements thereof. The grating has a diffraction surface, which is formed by a photolithography process. The diffraction surface has a first predetermined profile. The first profile is formed by a plurality of points each conducted by different equations. Consequently, each spectral component is focused on the predetermined output plane.

20 Claims, 25 Drawing Sheets

(56) References Cited

U.S. PATENT DOCUMENTS

| | | |
|---|---|---|
| 2001/0030746 A1 | 10/2001 | Hamm et al. |
| 2002/0054276 A1* | 5/2002 | Kurematsu .................. 353/31 |
| 2002/0105725 A1* | 8/2002 | Sweatt et al. .............. 359/566 |
| 2003/0107733 A1 | 6/2003 | Oka et al. |
| 2004/0114139 A1 | 6/2004 | Florek et al. |
| 2004/0196458 A1 | 10/2004 | Shimizu et al. |
| 2006/0044557 A1 | 3/2006 | Vakhshoori et al. |
| 2006/0262303 A1* | 11/2006 | Bonne et al. .............. 356/328 |
| 2007/0019194 A1* | 1/2007 | Chen et al. ............... 356/328 |
| 2007/0291266 A1* | 12/2007 | Handa et al. ............. 356/328 |
| 2008/0106735 A1* | 5/2008 | Becker-Ross et al. ....... 356/328 |
| 2009/0034080 A1 | 2/2009 | Ko |

* cited by examiner

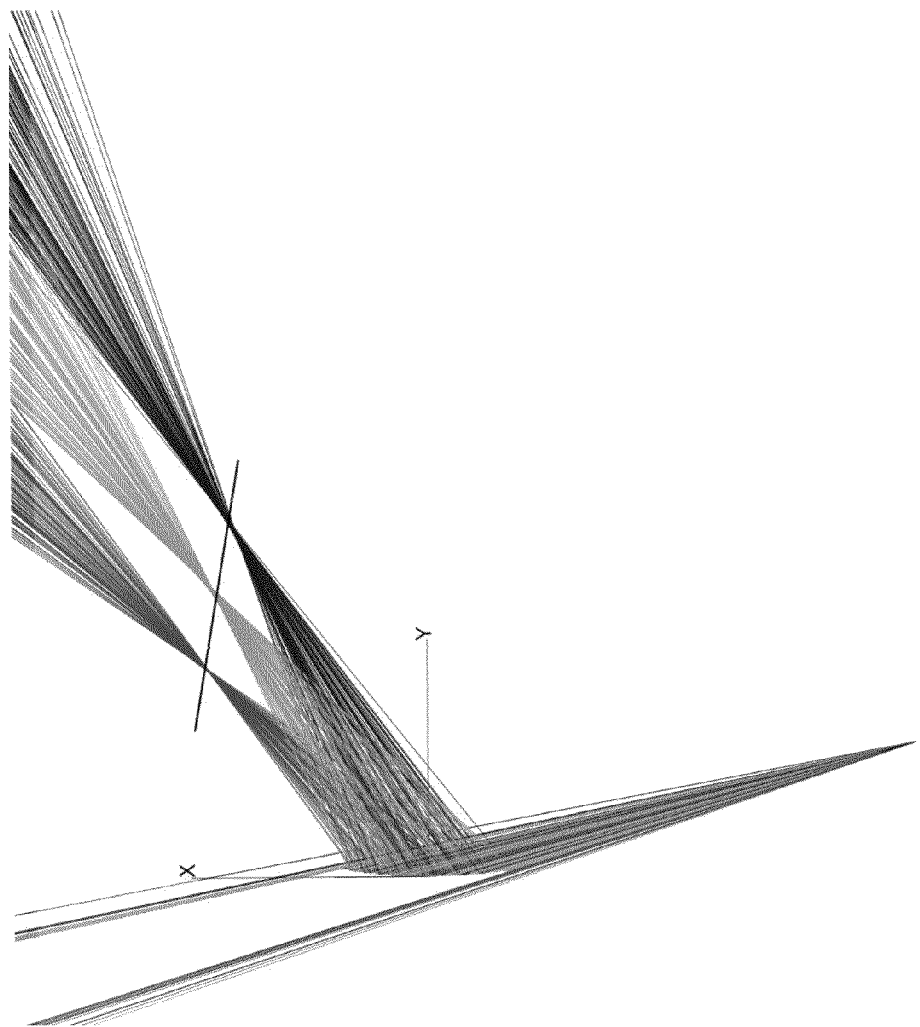
FIG. 11A

OPTICAL SYSTEM AND MANUFACTURING METHOD THEREOF

CROSS REFERENCE TO RELATED APPLICATION

This application is a continuation-in-part application of application Ser. No. 12/180,567, filed on Jul. 28, 2008 entitled "OPTICAL SYSTEM", which claimed the benefit of Taiwan Patent Application No. 096128494, filed on Aug. 3, 2007 entitled "OPTICAL SYSTEM", and this is also a continuation-in-part of application Ser. No. 12/045,836, filed on Mar. 11, 2008 entitled "OPTICAL SYSTEM", which claimed the benefit of Taiwan Patent Application No. 096109036 filed on Mar. 16, 2007, entitled "OPTICAL SYSTEM", the contents of which are incorporated herein by reference.

BACKGROUND OF THE INVENTION

1. Field of the Invention

The present invention relates to a novel diffraction grating and, more particularly, to a diffraction grating for being applied to an optical system.

2. Description of the Related Art

A spectrometer is typically implemented to measure photometry with regard to radiation sources, and a grating in such spectrometer is a component for diffusing a multi-frequency radiation. Instruments suchlike are extensively applied to deal with complex measurement tasks for acquiring accurate results. However, such instruments are currently disadvantageous by: (a) bulkiness resulted in great cost and using limitedly at fixed locations, (b) time consumption for wideband spectrum measurement, and (c) demand for skilled operators because cautious operation is necessary.

U.S. Pat. No. 5,550,375 provides an infrared-spectrometric sensor 100 for gases, as shown in FIG. 1, which comprises a microstructured body having a reflective grating 110, a multi-frequency IR radiation source 120, and a radiation receiver 130 for receiving IR of a fixed range of wavelength. Nevertheless, this infrared-spectrometric sensor is merely capable of measuring spectrums within a narrow wavelength range. In a case that multiple components are to be analyzed, the spectral signals would be absorbed at several different wavelengths, not only in the infrared region. Besides, the entrance slit, the two exit slits and the center of the mirror grating should be situated on a Rowland circle. Therefore, the applications of this prior spectrometric sensor are limited.

A simultaneous spectrometer 200 is another device for detecting radiation sources, as shown in FIG. 2. It comprises an entrance slit 200, a concave grating 210 capable of forming holographic images, and a photoelectric diode array 230. The aforementioned components are fixedly positioned and immovable while these components present the reliable advantages such as high accuracy and excellent optical efficiency. In such spectrometer, the photoelectric diode array is applied with limitations because the photoelectric diode array is substantially a flat plane formed with a large number of single crystals, while the focuses of the spectrometer are distributed on a curved surface and, more particularly, on the Rowland circle. In this case, only two intersection points could be formed between the Rowland circle and the photoelectric diode array. Thus, the spectral signals reflected by the concave grating 210 could be merely focused on the two intersection points of the photoelectric diode array. One preferred application of such simultaneous spectrometer is to increase the radius of the Rowland circle so that the distribution of the focuses can be a planar distribution approximately. However, this approach consumes large space and requires a large detector. An alternative solution is as the disclosure of U.S. Pat. No. 6,005,661, wherein a great quantity of optical fibers are employed to lead out signals with diverse wavelengths focused on the Rowland circle. Although such approach can compromise the disadvantages of photoelectric diode array, problems such as energy lost and degenerative resolution may also occur when the focused signals are led out by the optical fibers.

Instead, a diffraction grating generating linear outputs is a preferable option for an optical system. As shown in FIG. 3A, the inventor of U.S. Pat. Nos. 4,695,132 and 4,770,517 provides a laser scanning system 300, which implements one or more f θ lenses 310 to focus scattered light beams on a linear output plane 320. As shown in FIG. 3B, U.S. Pat. No. 6,650,413 provides a spectrometer 301 using a diffraction grating 311 and comprising an assembly of a collimator 313 and a correcting lens 315 for focusing the output spectral components on an image plane 321 in accordance with an $f \sin(\theta)$ distribution.

However, the above-mentioned inventions are all systems with complex structures and therefore fail to achieve the objective of microminiaturizing an optical system to become portable.

SUMMARY OF THE INVENTION

It is one objective of the present invention to provide a diffraction grating made by a photolithography process for being applied to an optical system. The diffraction grating linearly distributes spectral components of all wavebands (including infrared, visible light and ultraviolet) on an image plane in accordance with the wavelength and can achieve desired image quality.

It is another objective of the present invention to provide an optical system with simple structure and microminiaturized volume that facilitates portability.

It is yet another objective of the present invention to provide an optical system, which can be mass-produced with reduced manufacturing costs and feasible for long-term use.

To achieve these and other objectives, the present invention provides the optical system that comprises an input for receiving an optical signal, a predetermined output plane, and a diffraction grating. The diffraction grating has a diffraction surface for separating the optical signal received from the input into a plurality of spectral components to be focused on the predetermined output plane. The diffraction surface, which is made by a photolithography process, has a first profile. The first profile is formed by a plurality of points conducted by different equations for separating an optical signal received from the input into a plurality of spectral component so that the spectral components are focused on the predetermined output plane.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein:

FIG. 11A is a ray-tracing diagram according to a second embodiment of the present invention.

DETAILED DESCRIPTION OF THE EMBODIMENTS

The technical features adopted in the present invention in attempt to achieve the aforementioned effects and objectives will be described in detail in company with particular embodiments and the accompanying drawing so as to be clearly comprehended.

Figure 1:
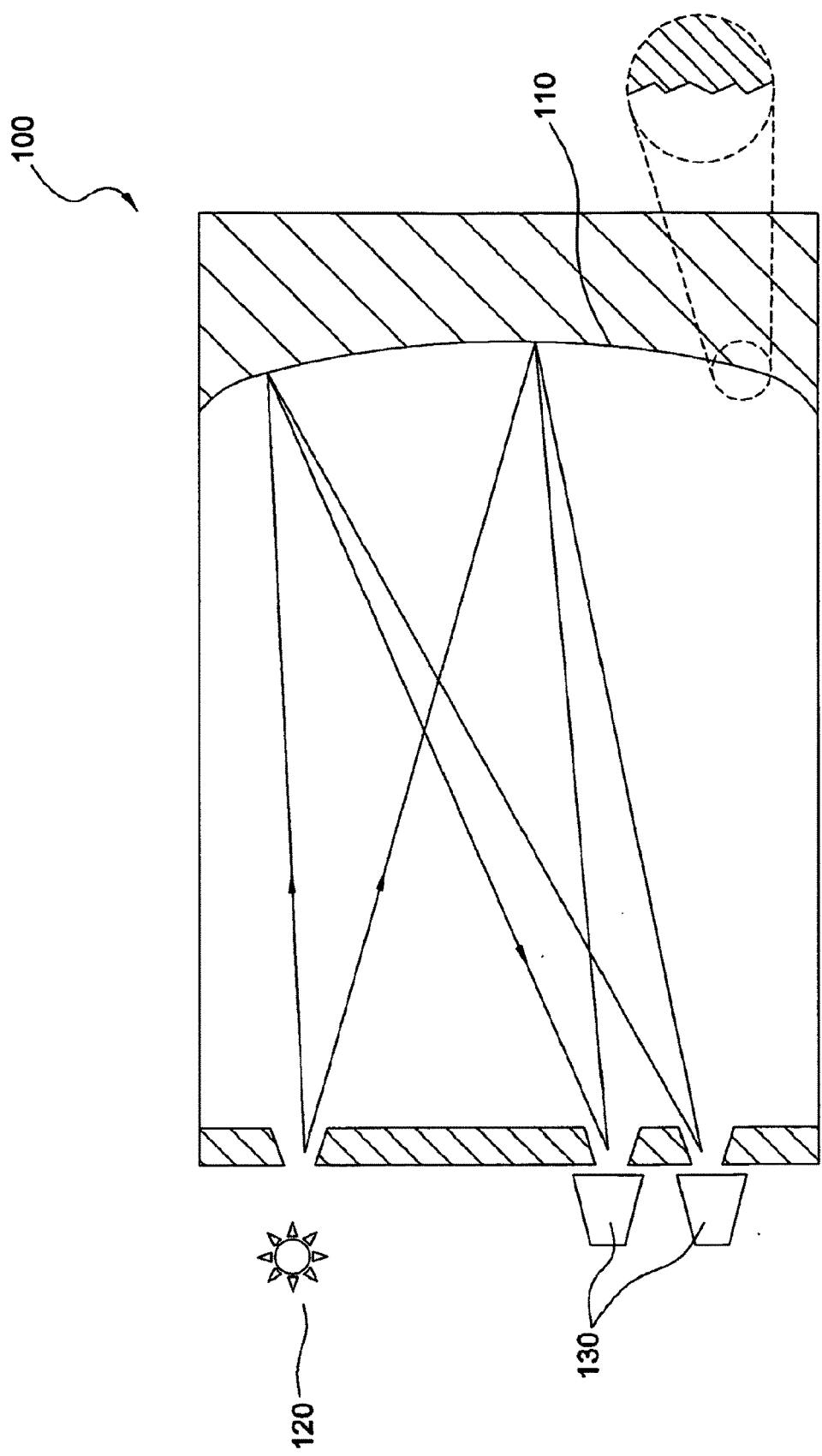
FIG. 1 is a schematic drawing illustrating a prior infrared-spectrometric detector.
Figure 2:
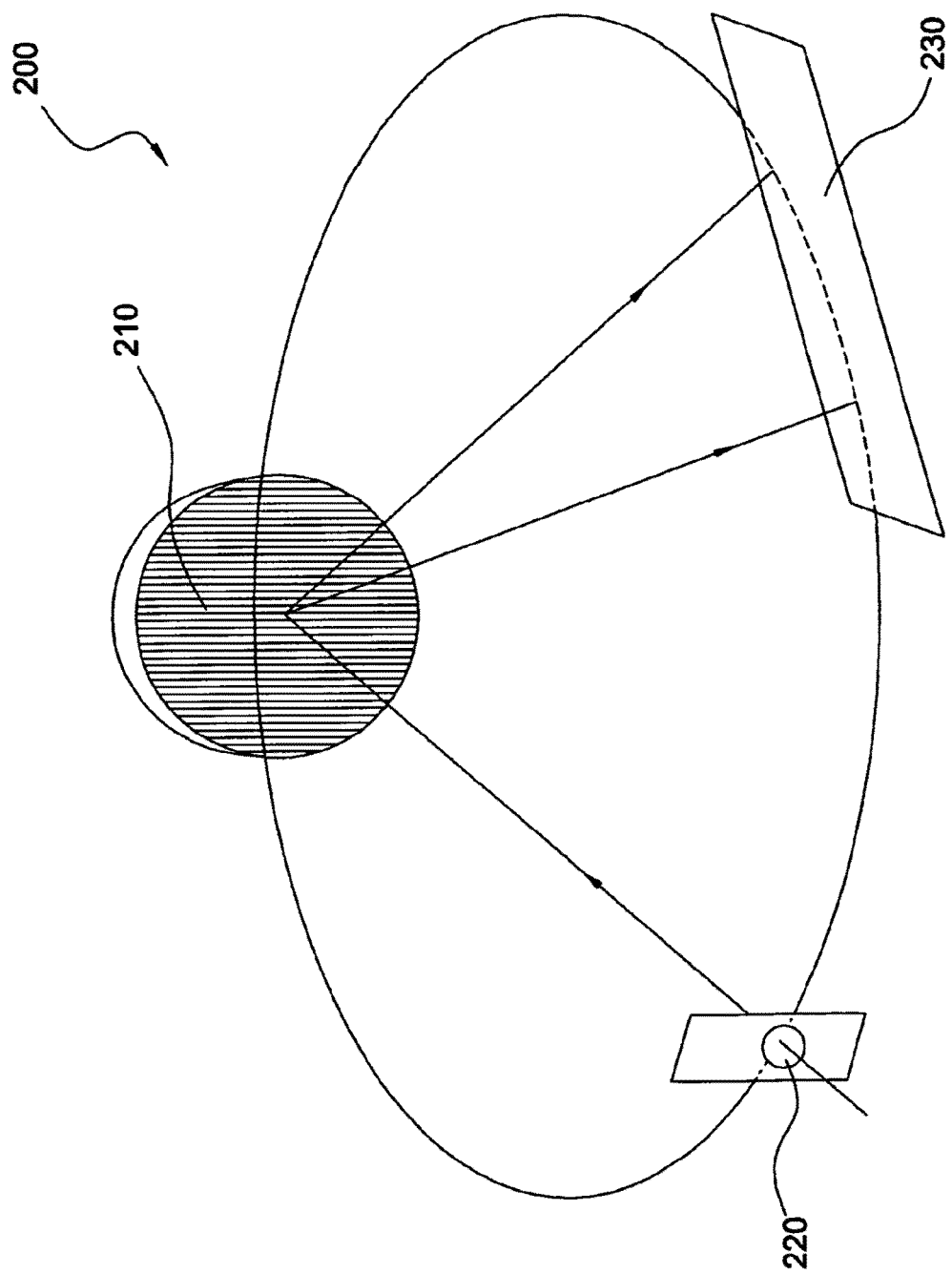
FIG. 2 is a schematic drawing illustrating a prior simultaneous spectrometer.
Figure 3A:
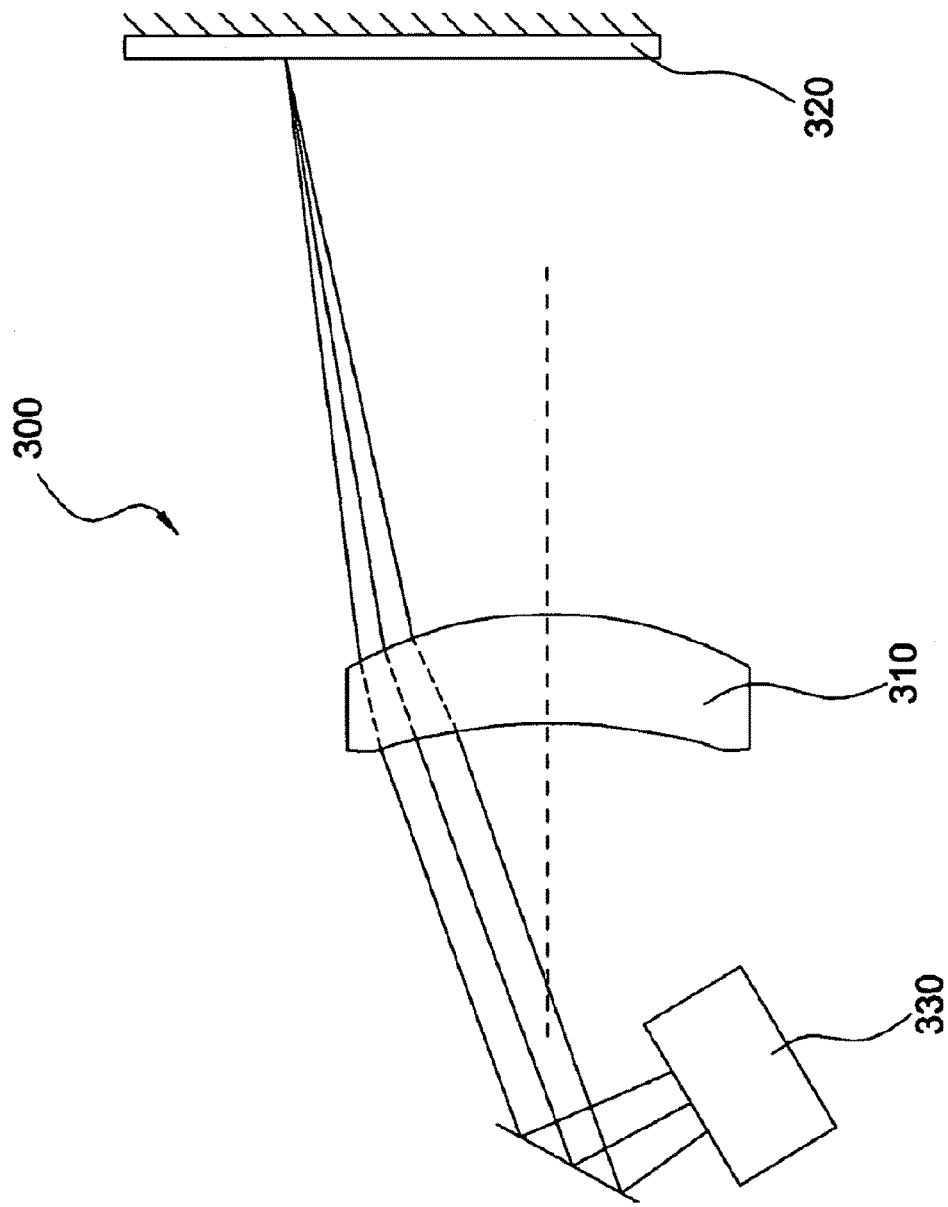
FIG. 3A is a schematic drawing illustrating a prior laser scanning system.
Figure 3B:
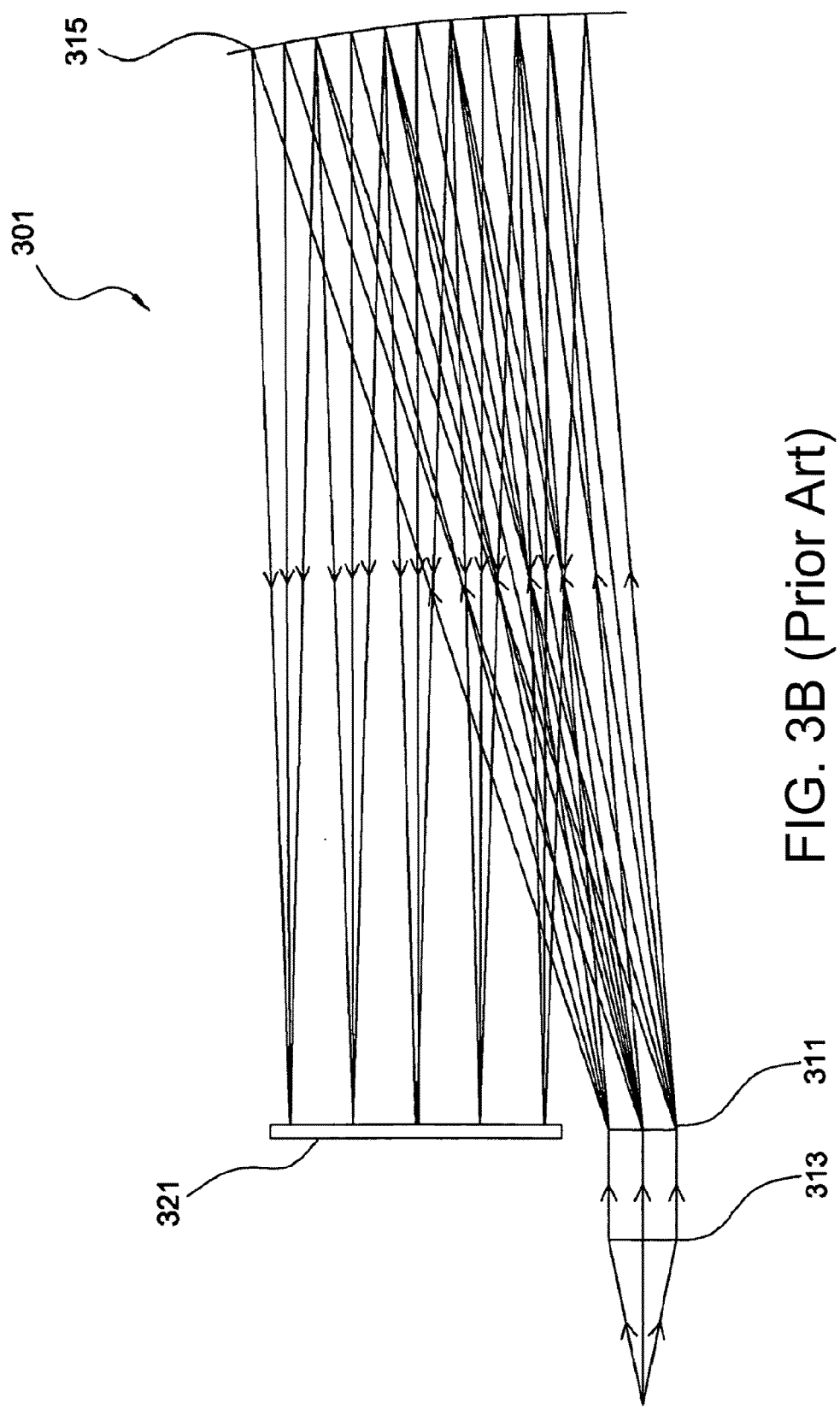
FIG. 3B is a schematic drawing illustrating f a prior spectrometer.
Figure 4:
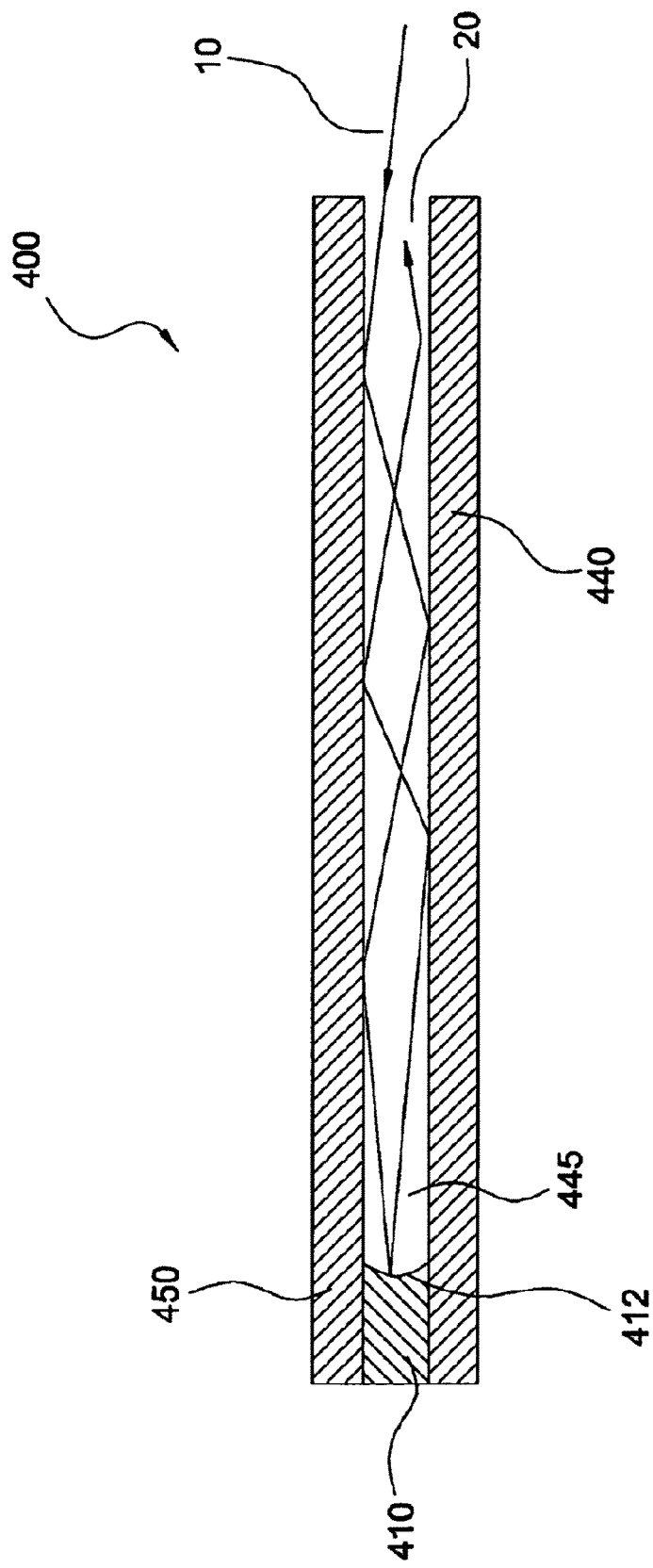
FIG. 4 is a sectional view of an optical system according to the present invention.
Figure 5A:
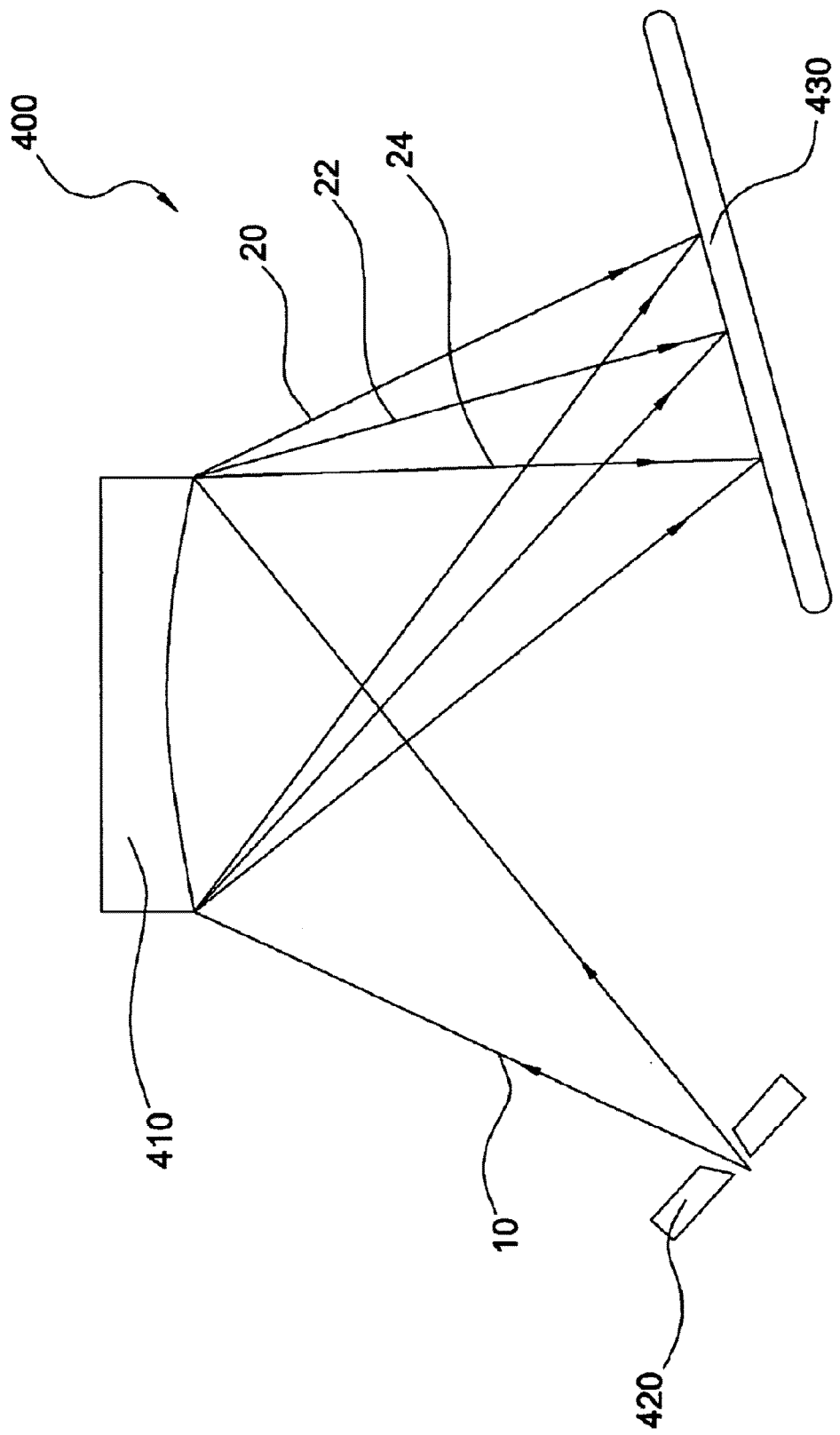
FIG. 5A is a schematic drawing of aforementioned optical system according the present invention.

Please refer to FIGS. 4 and 5A, wherein a preferred embodiment of the present invention is provided. Therein, an optical system 400 comprises a base 440, a cover 450, an input 420, a predetermined output plane 430, and a diffraction grating 410.

An inner space 445 is formed between the base 440 and the cover 450 and a plurality of spacers (not shown) may be sandwiched between the base 440 and the cover 450 to uphold the inner space 445 and separate the base 440 from the cover 450 for a desired distance. According to one preferred embodiment of the present invention, the diffraction grating 410 is disposed on the base 440 and has a diffraction surface 412 that faces the inner space 445.

The input 420 is typically a slit wherethrough an optical signal 10 is allowed to enter the inner space 445. The input 420 may alternatively be an end of an optical fiber so that the optical signal 10 can be transmitted through the optical fiber into the inner space 445 of the optical system 400. According to one preferred embodiment of the present invention, the input of the optical system is a slit attached with an optical fiber, and the optical signal 10 can be transmitted via the optical fiber and then enter the optical system 400 through the slit from an end of the optical fiber. The slit may be made by the aforementioned photolithography process, EDM (electro-discharging machining), laser-writing, slicing, or may be made by a molding process.

The diffraction surface 412 for separating an optical signal 10 entering the optical system 400 into a plurality of spectral components, such as 20, 22, and 24, which have different wavelengths. These spectral components are focused on the predetermined output plane. When being focused, the spectral components presented on the predetermined output plane have the FWHM (full width at half maximum) smaller than or equal to the predetermined wavelength resolution. The diffraction surface 412 is substantially concave, which has a first profile. The first profile is formed by a plurality of points and each location of these points is conducted by different optical path equations individually. A representation of the equations is, $$F = \sum_{ijk} F_{ijk} W^i I^j$$

which is a polynomial expansion. Therein, the parameters comprise the predetermined vertical interval of the points, the entrance slit width, incidence optical path length, the incident angle, the diffraction angle, the diffraction optical path length, the spectral component resolution, the maximum resolving wavelength, the minimum resolving wavelength, the diffraction order, and the predetermined output plane.

Figure 5B:
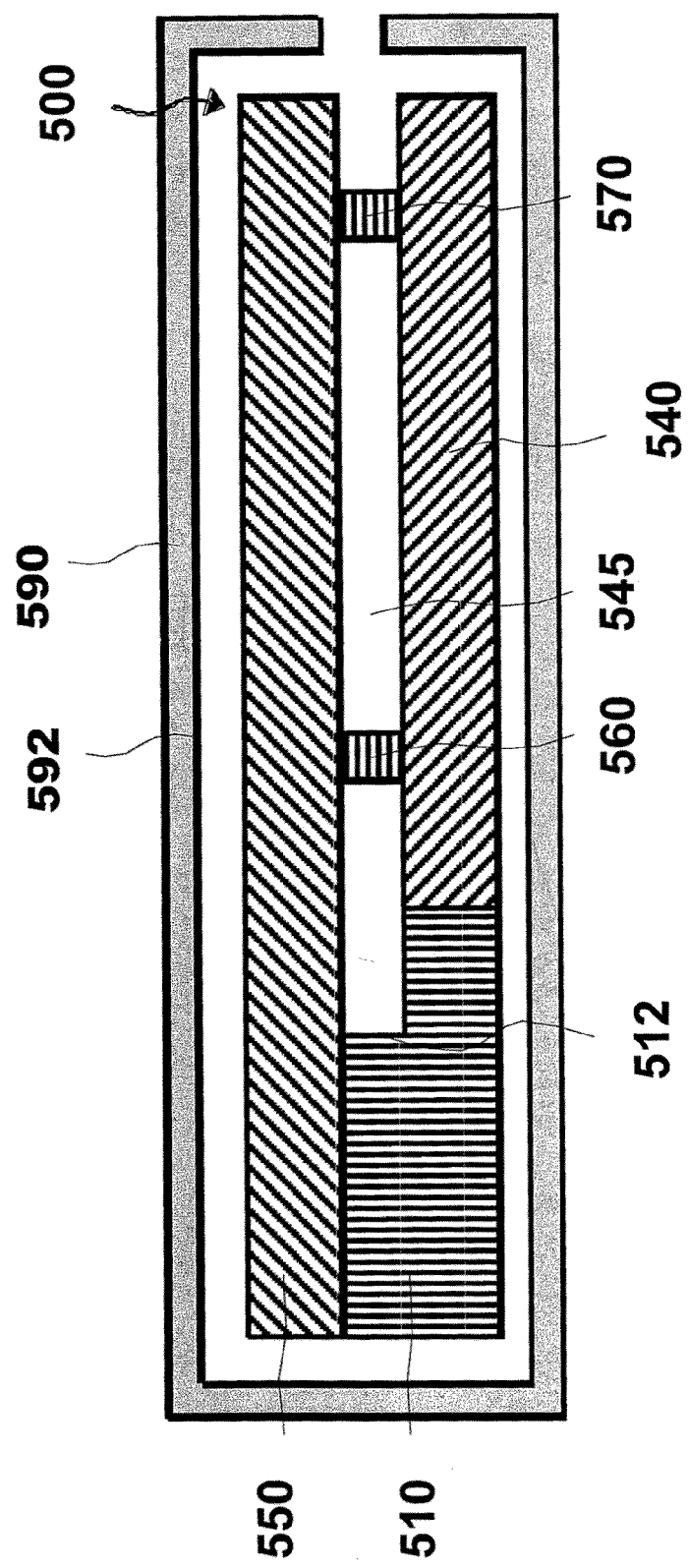
FIG. 5B illustrates the diffraction grating according to another preferred embodiment of the present invention.

According to another preferred embodiment of the present invention as shown in FIG. 5B, an optical system 500 comprises a base 540, a cover 550, and a diffraction grating 510. An inner space 545 is formed between the base 540 and the cover 550. Therein, the base 540 and the cover 550 may be made of an identical material or different materials selected from a III-V semiconductor, a Group IV element, glass, plastic or a metal.

A plurality of spacers 560 are sandwiched between the base 540 and the cover 550 to uphold the inner space 545 and separate the base 540 from the cover 550 for a desired distance. Besides, a plurality of light shielding elements 570 are also sandwiched between the base 540 and the cover 550 for shielding superfluous lights.

The spacers 560 and the light shielding elements 570 are formed on either the base 540 or the cover 550 by a molding process or a photolithography process. Therein, the photolithography process for making the spacers comprises applying a layer of a photoresist on one of the base 540 and the cover 550, patterning the photoresist, and solidifying the patterned photoresist so as to form the spacers 560.

As shown in FIG. 5B, a housing 590 is provided at an exterior of the optical system 500. The housing 590 has an inner surface 592, which is non-reflective or light absorbing so as to prevent an external light from disturbing the operation of the optical system 500. The inner space 545 of the optical system 500 may be filled with air or a proper liquid, which has a refractive index greater than those of the base 540, the cover 550 and the grating 510.

Figure 5C:
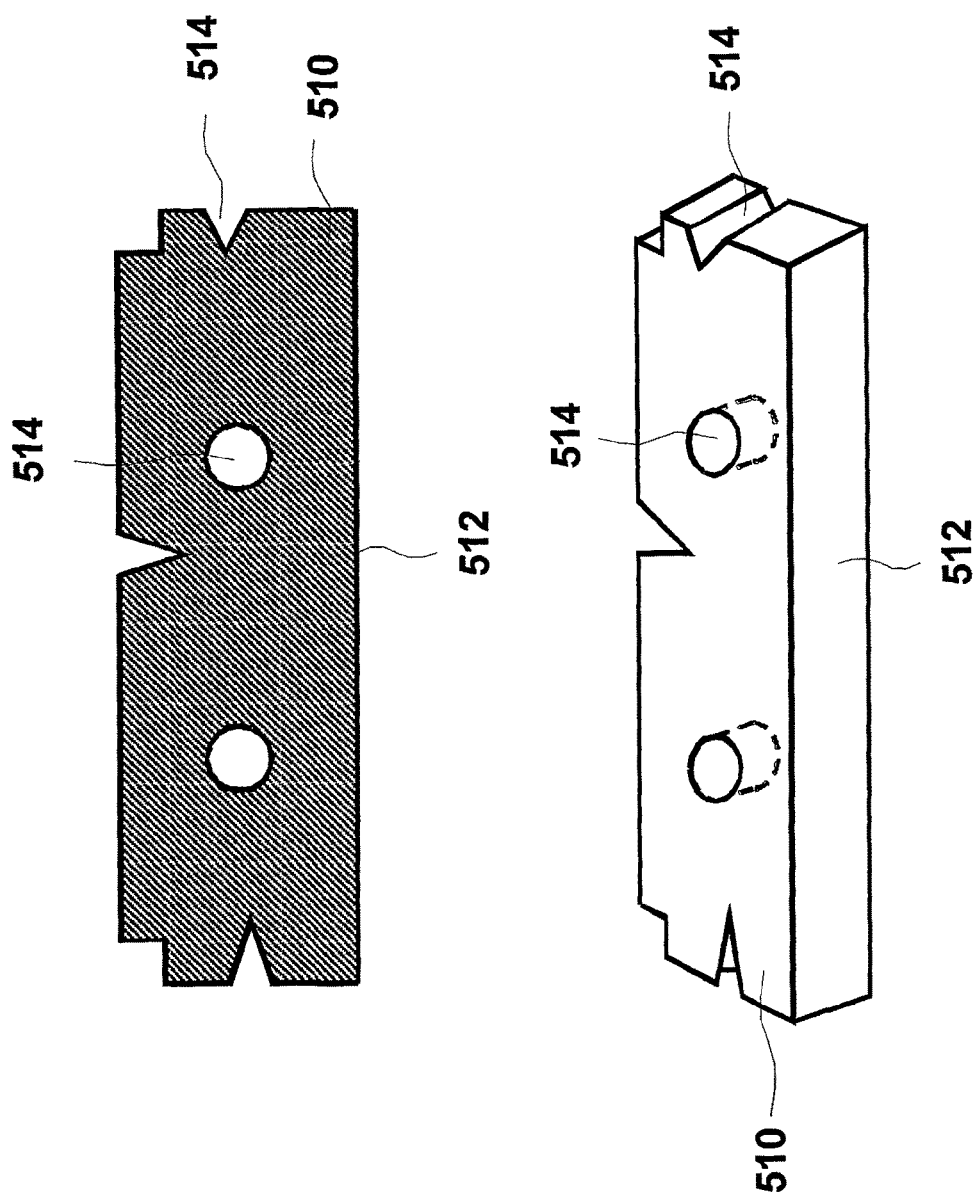
FIG. 5C illustrates the diffraction grating according to another preferred embodiment of the present invention.

As shown in FIG. 5C, at least one recess 514 is provided on a contacting surface of the diffraction grating 510 abutting the base 540 or the cover 550. Meanwhile, at least one second positioning part (not shown) positionally corresponding to the recess 514 is provided on a contacting surface of the base 540 or the cover 550 abutting the diffraction grating 510. Accordingly, by combining the recess 514 to the second positioning part, the diffraction grating 510 is guided and properly disposed on the base 540 or the cover 550.

At least a first reflection layer is provided to cover a contacting surface of the base 540 facing the inner space 545. The first reflection layer is typically made of a metal. The metal, more particularly, is selected from one of the group consisting of silver, gold, aluminum, platinum, titanium and nickel. Besides, At least a second reflection layer is provided to cover a contacting surface of the cover 550 facing the inner space 545. The second reflection layer is typically made of a metal, and the metal is, more particularly, also selected from one of the group consisting of silver, gold, aluminum, platinum, titanium and nickel.

The diffraction grating 510 has a diffraction surface 512, whereon at least a third reflection layer is formed for covering it. The third reflection layer is made by plating a metal on the diffraction surface 512 to form a metal film. The metal is selected from one of the group consisting of silver, gold, aluminum, platinum, titanium and nickel. One of the preferred embodiment of the constitution and arrangement of the first, second or the third reflection layers is a film of titanium of 50 nm overlaid by 200 nm of silver and then overlaid by 1 μm of silica sequentially. Besides, TiO2 or other dielectric materials can be substituted for the silica.

The film of titanium is not indispensable to the first and the second reflection layer, however, if the cover 450 or the base 440 is made of plastic rather than metal, for the titanium serves to bind the silver with the cover 450 or the base 440 when the cover 450 or the base 440 is metallic. So, whether the reflection layer contains the film of titanium depends on the material of the cover 450 or the base 440.

Figure 6:
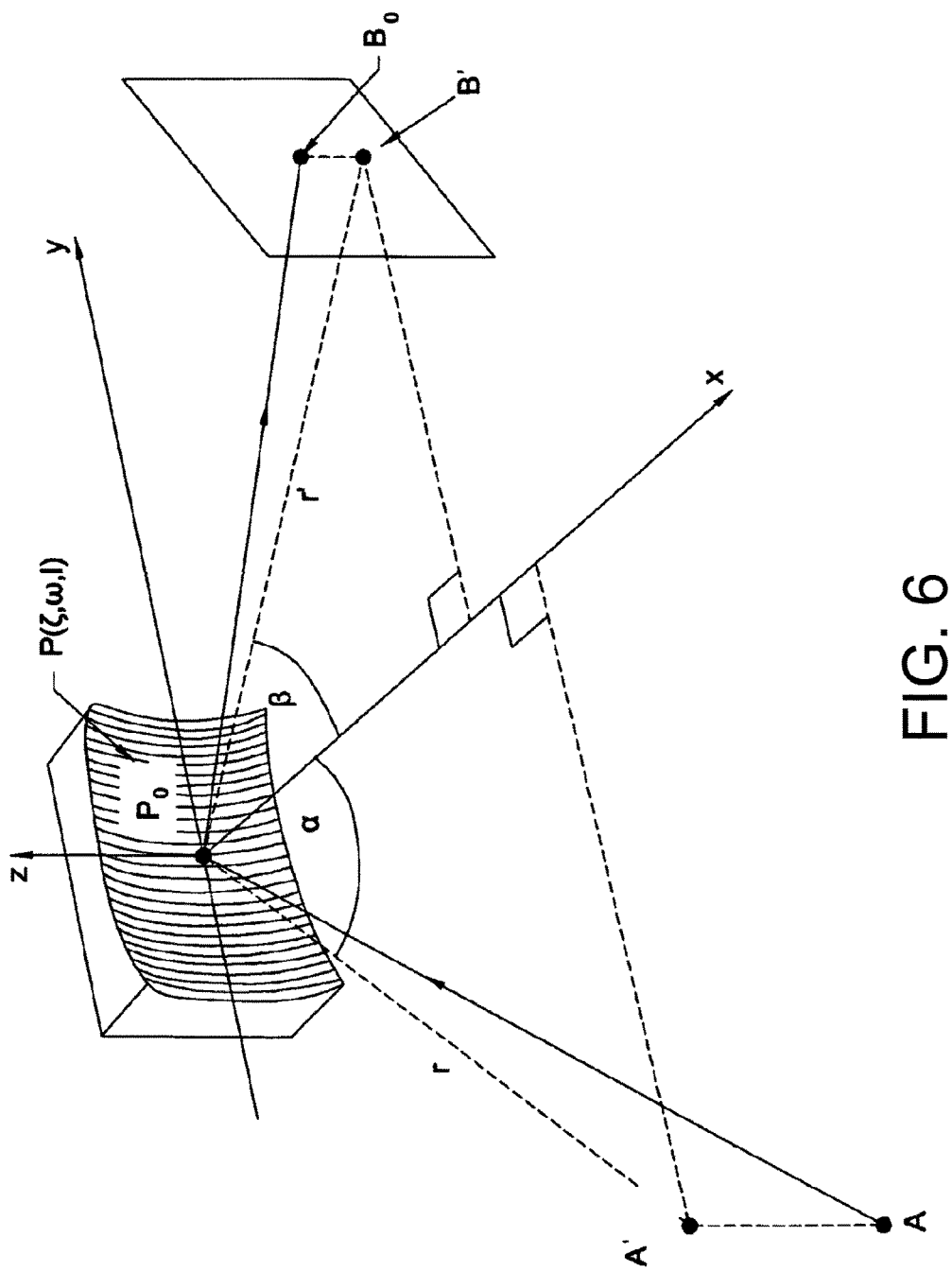
FIG. 6 is a schematic drawing of another optical system according to the present invention.
Figure 7A:
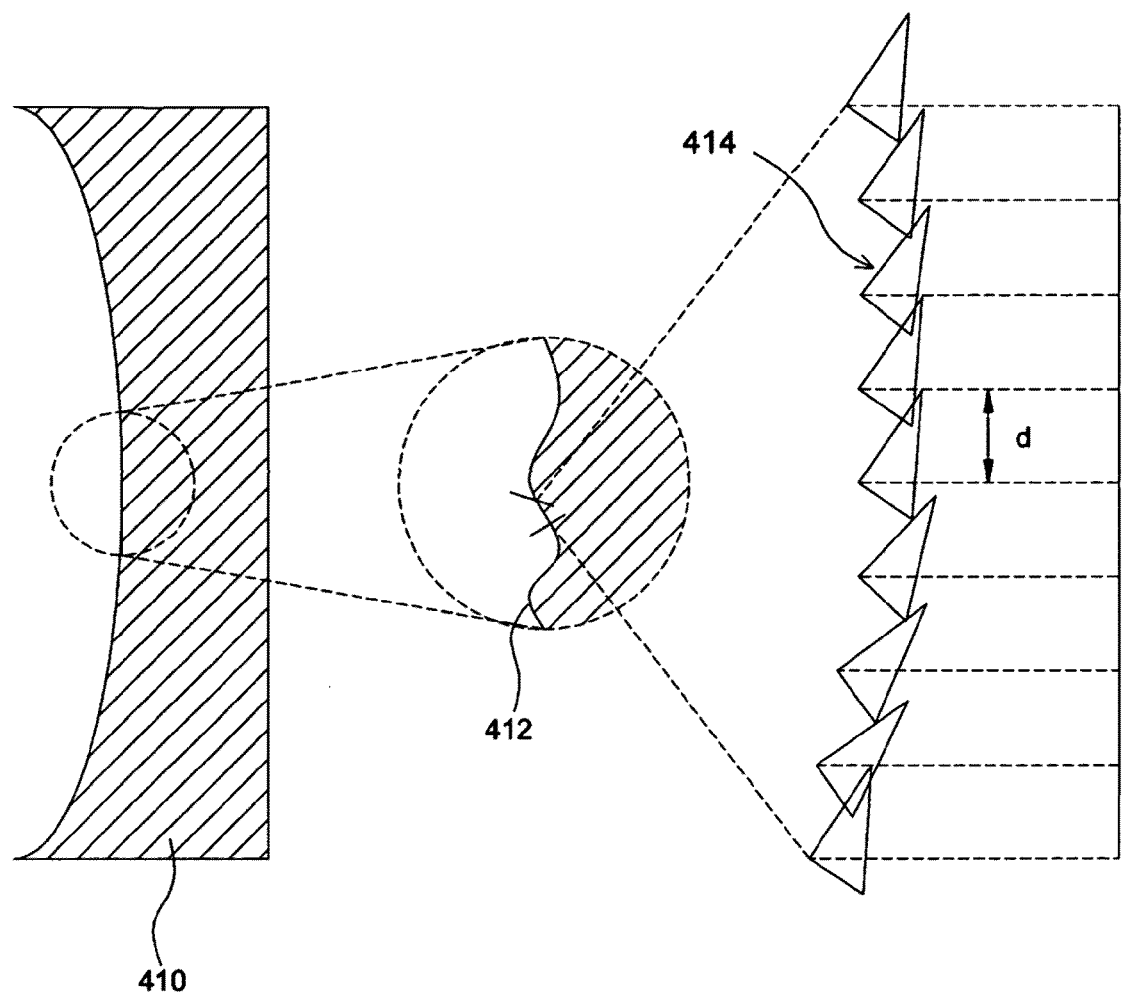
FIG. 7A is a schematic drawing of a diffraction grating according to the present invention.

In FIG. 6 and FIG. 7A, according to one preferred embodiment of the present invention, a diffraction grating 410 has a first profile 412 formed by a plurality of points P. Each P is represented by a coordinate (ξ, ω, I), wherein ξ, ω, and I are components of P at the x, y and z coordinate axes, respectively. Therein, the coordinate of P0 is set as (0, 0, 0). An optical signal A has a single wavelength, and a projective point A' thereof on the x-y plane is away from P0 with a distance r, which is the incidence arm length. An included angle between a line linking A' and P0 and the x coordinate axis is the incident angle α. The optical signal A passes P0 and arrives a point B0 on the predetermined output plane. A projective point B' of the point B0 on the x-y plane is away from P0 for a distance r', which is the diffraction arm length. An included angle between a line linking B' and P0 and the x coordinate axis is the diffraction angle β. By substituting the parameters, such as r, r', α, β, the expected grating width, the expected resolution, the expected range of measuring wavelength, and entrance slit width, into $$F = \sum_{ijk} F_{ijk} W^i I^j$$

the optical path equation, a plurality of equations related to the plural P points that form the first profile can be conducted and the coordinate of the first profile can be in turn derived.

The diffraction surface 412 is a reflection surface, which may be formed by plating the diffraction grating 410 with a metal film through a method selected from the group consisting of vapor deposition, sputtering, evaporation, polishing, and electroplating. The metal film may be formed with silver, gold, aluminum, platinum, titanium or nickel.

In FIG. 7A, the diffraction surface 412 further has a second profile 414 with a periodic structure made by a photolithography process. According to one preferred embodiment of the present invention, the diffraction surface 412 has a saw-toothed periodic structure wherein tops of the saw teeth are inclined at a fixed angle, and a vertical interval d between projections of the adjacent tooth tops is a grating pitch. One preferred embodiment of the present invention is as shown in FIG. 7A, wherein the grating pitches are constant. Alternatively, the grating pitches may be variable. The second profile 414 is formed by a plurality of triangles. A line linking the pinnacles of the triangles constitutes the first profile. These triangles may be congruent triangles or incongruent triangles, wherein the inclined angles of the triangles are designed to optimize the diffraction efficiency for a specific diffraction level.

Figure 7B:
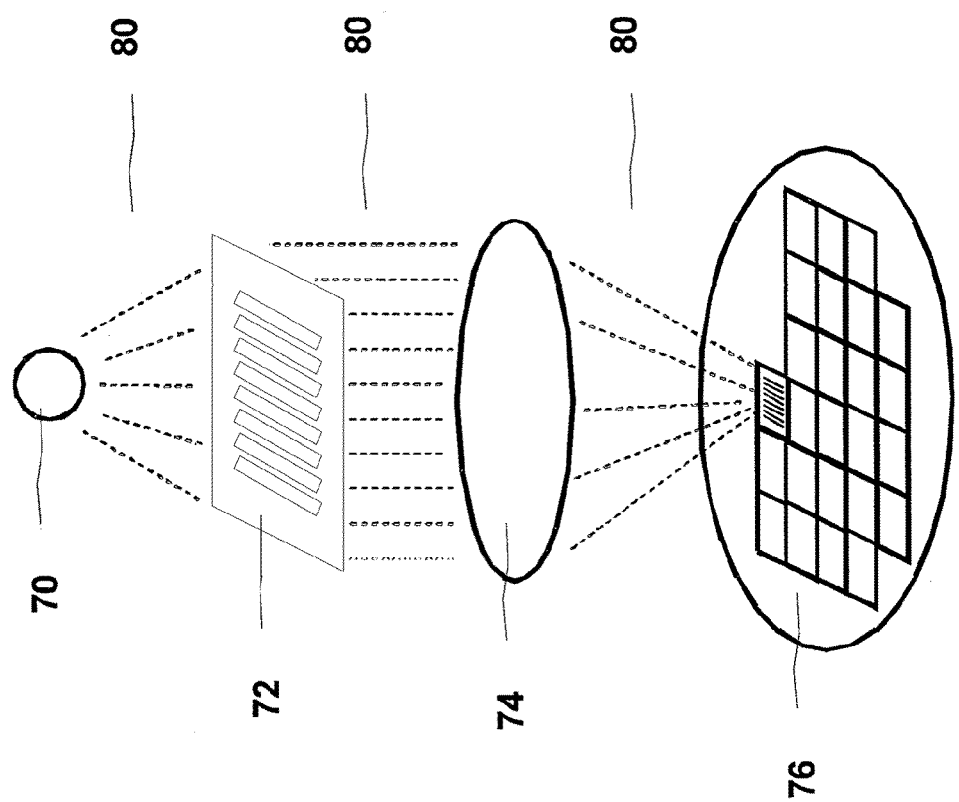
FIG. 7B is a schematic drawing showing the formation of the diffraction grating according to one preferred embodiment of the present invention.

According to FIG. 7B, a designed periodic pattern is used to make a photomask 72 and then a light 80 from an exposure source 70 passes through transparent regions on the photomask 72 and proceeds to passing a lens 74 so as to react with a photoresist pre-applied on a surface of a substrate 76 upon an optical imaging principle. The above process also referred to as exposure. Subsequently, after the exposed and non-exposed photoresist portions are chemically processed, the pattern on the photomask 72 can be transferred to the substrate 76 so as to form the periodic structure on the diffraction surface 412. In such photolithography process, the substrate 76 may be made of a III-V semiconductor, a Group IV element, glass, plastic or a metal.

The predetermined output plane may be a flat plane or in any geometric shape other than a cylinder which includes the Rowland circle, such as a curved surface, a non-cylindrical surface or a wavy surface. The predetermined output plane may also be any geometric shape other than a cylindrical surface whose cross section is a Rowland circle, such as a curved surface, a non-cylindrical surface or a wavy surface. A cylindrical output plane can be implemented by applying the Rowland Circle theory. A detector is provided on the output plane to receive the focused spectral component signals. The detector is a light detector having a photoelectric diode array, such as a CCD (charge-coupled device) or a CMOS (Complementary Metal-Oxide-Semiconductor).

The present invention may be embodied as the following described embodiments.

[Embodiment 1]

Figure 8:
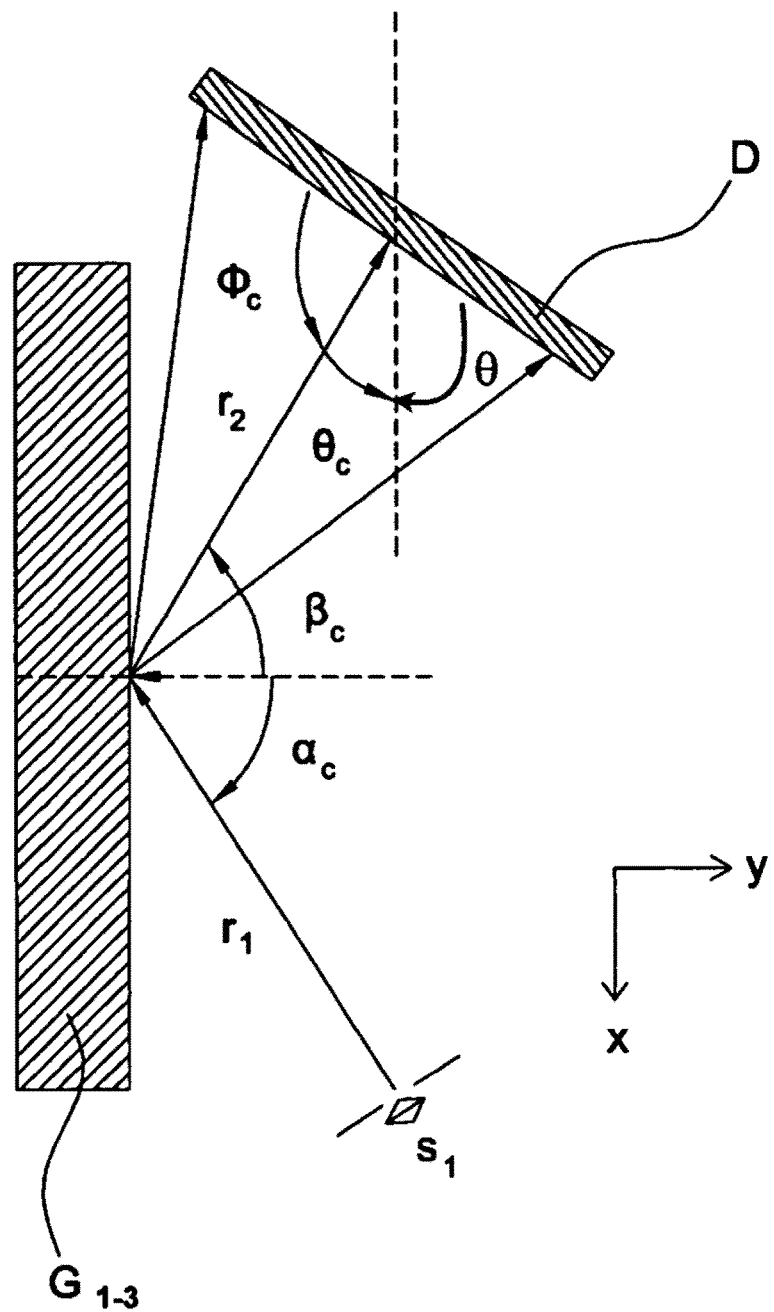
FIG. 8 is a schematic drawing showing an experimental system.
Figure 9:
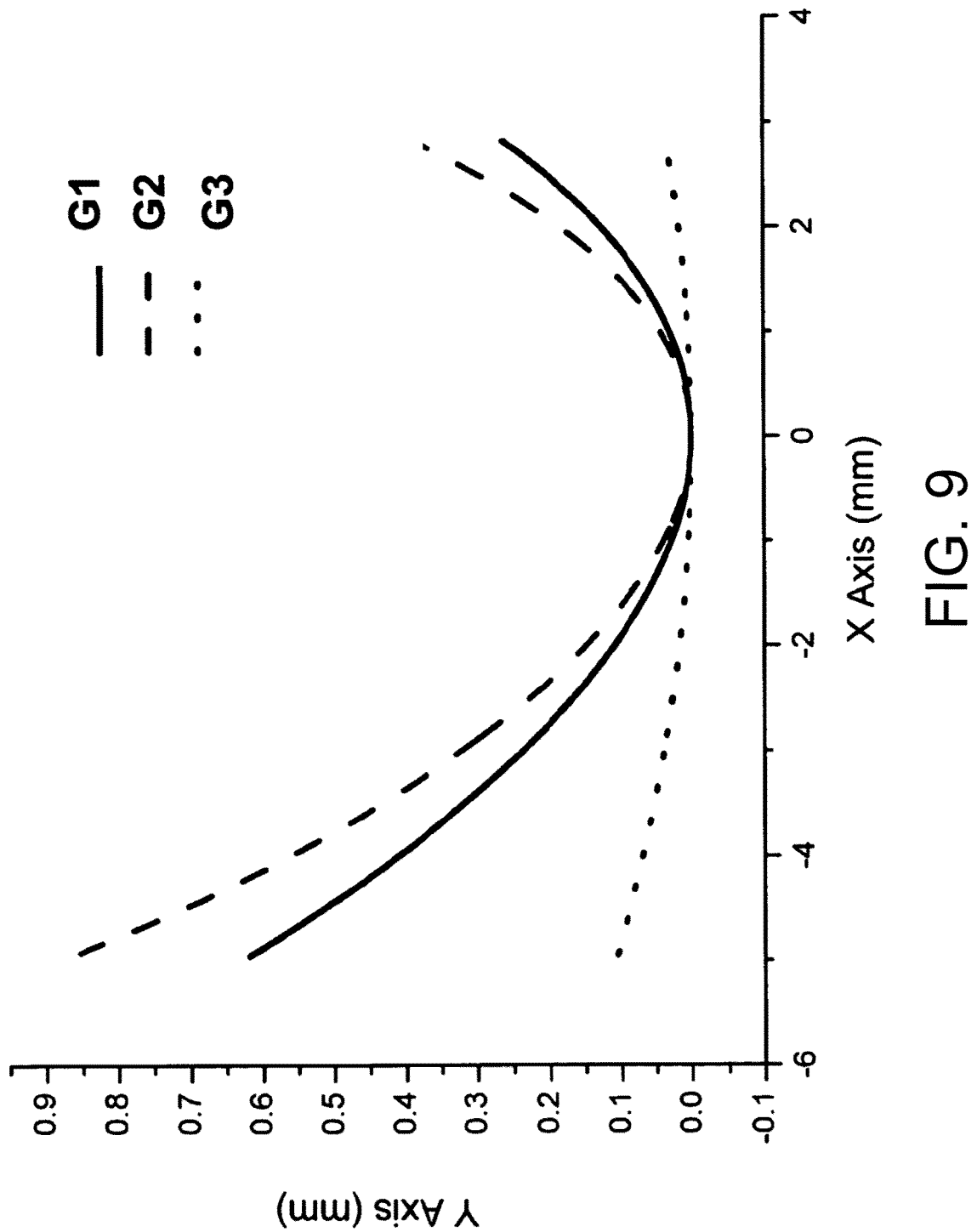
FIG. 9 is a comparison diagram of profiles of the exemplificative diffraction gratings.
Figure 10A:
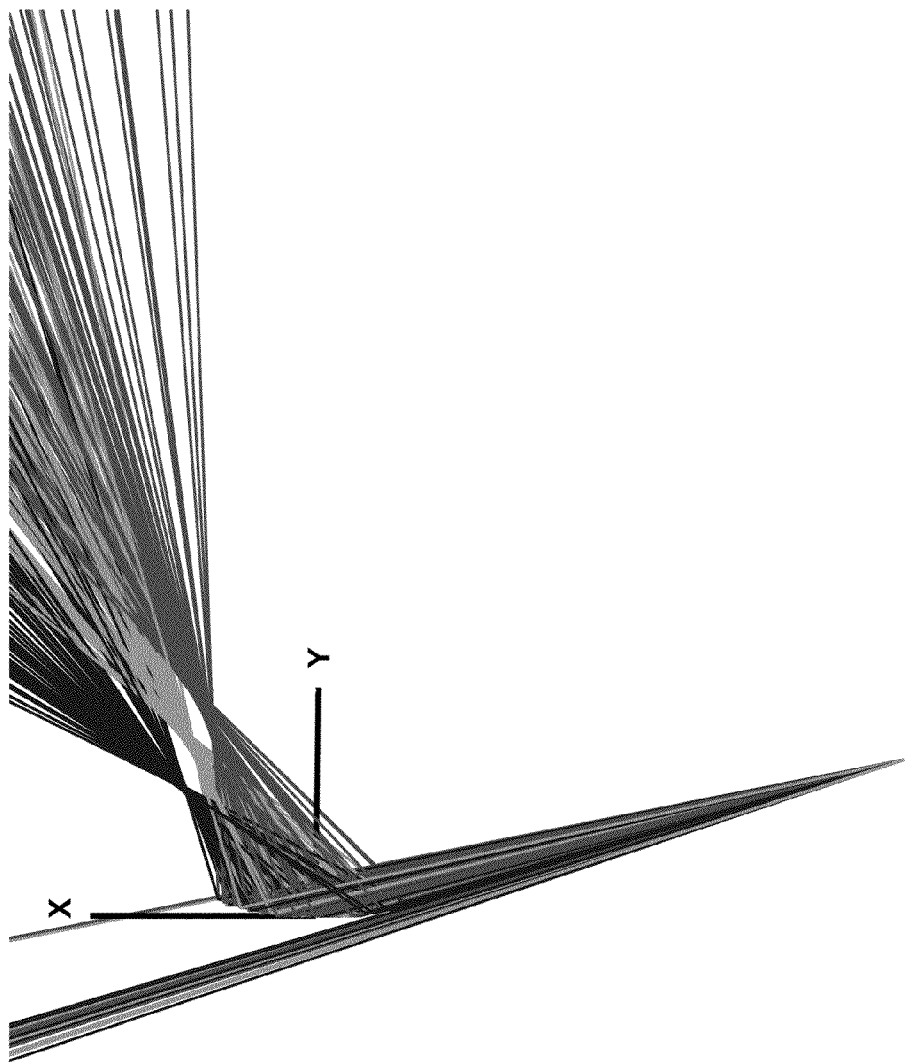
FIG. 10A is a ray-tracing diagram according to a first embodiment of the present invention.
Figure 10A:
Figure 10B:
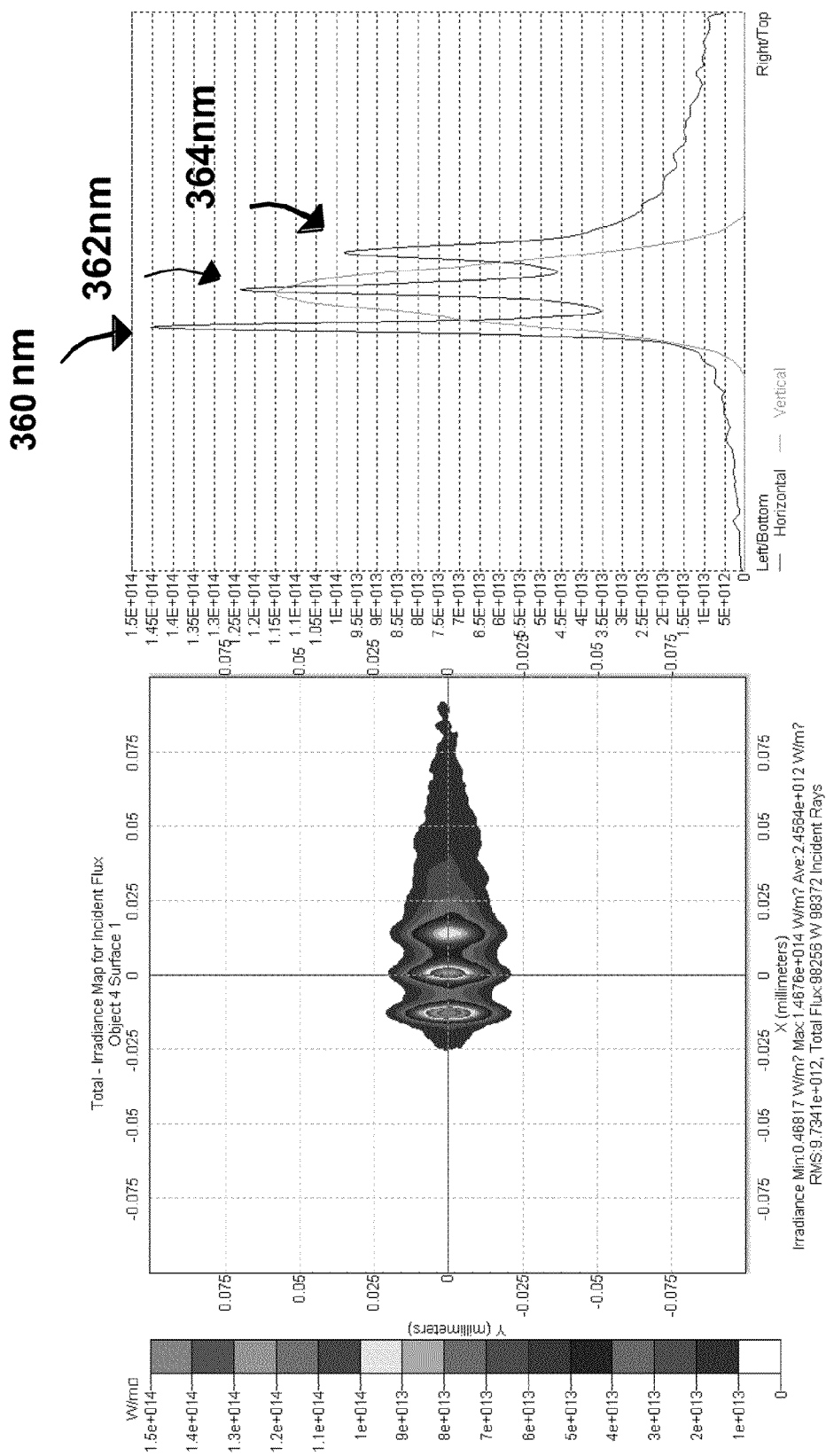
FIGS. 10B to 10D are spectrograms according to the first embodiment of the present invention.
Figure 10C:
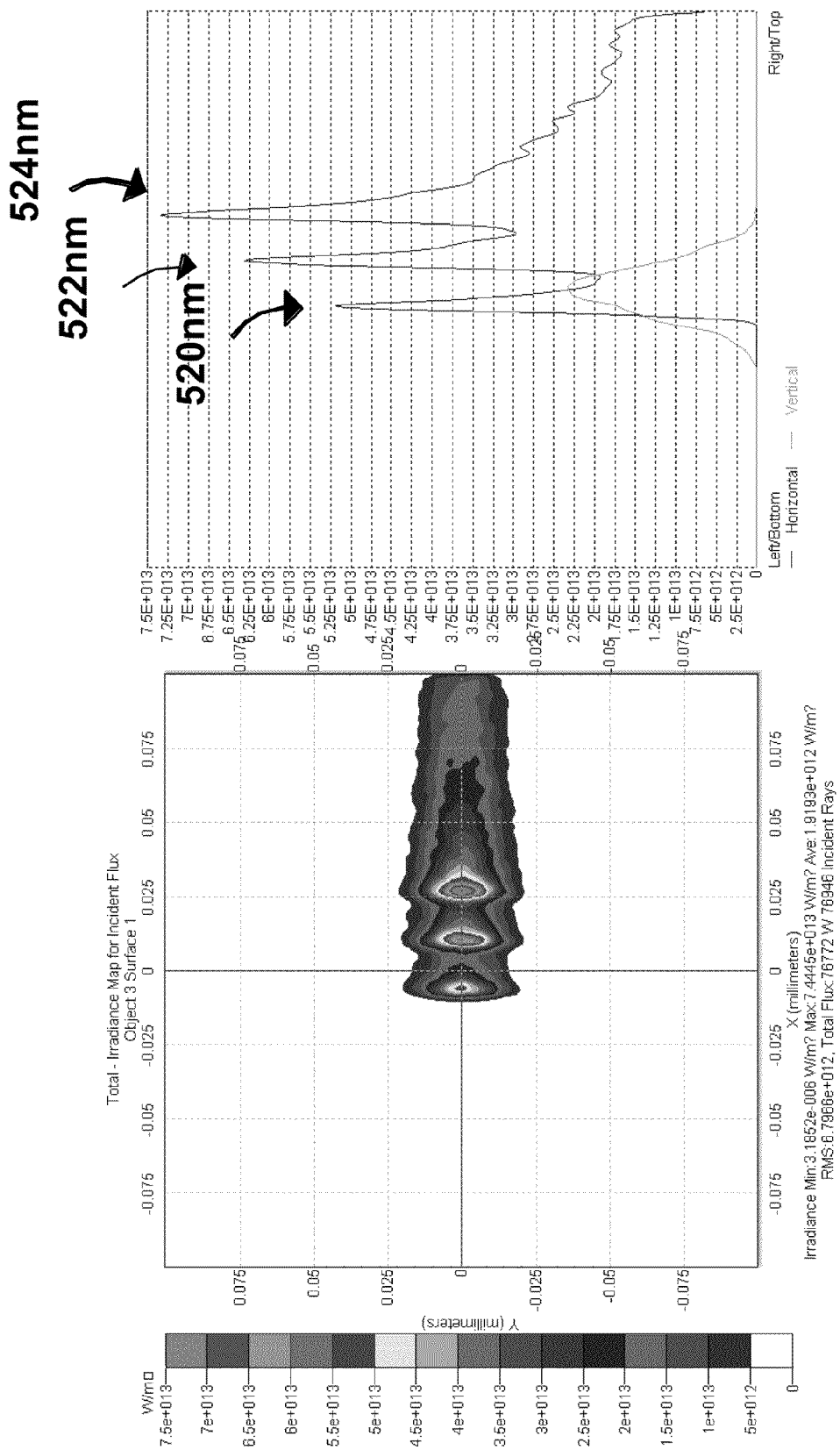
Figure 10D:
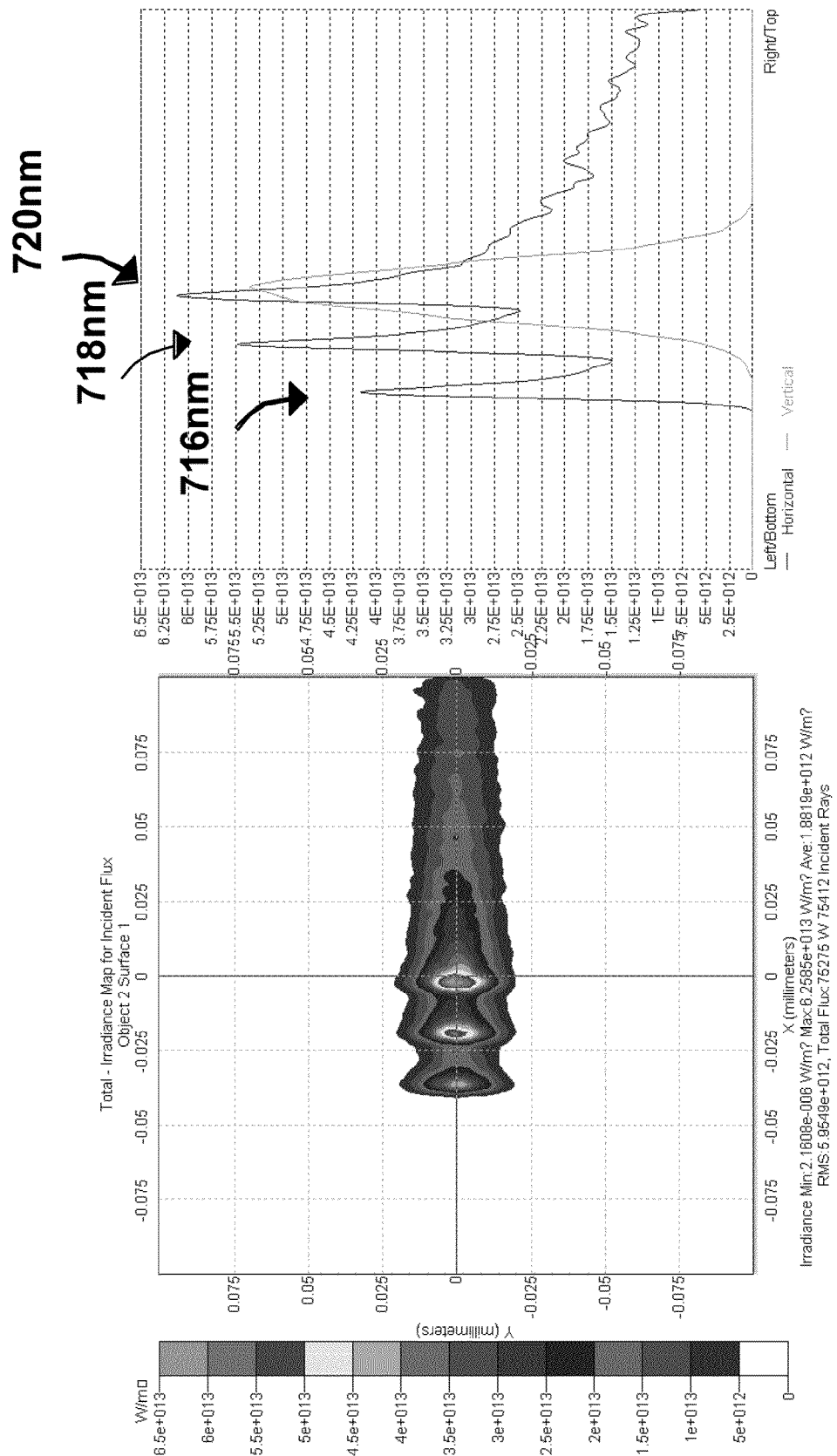

A grating G1 is provided with a profile as shown in FIG. 9. The experiment conditions are referred to FIG. 8, wherein the entrance slit width $s_1$=62.5 μm, the incident angle $α_c$=75°, the incidence arm length $r_1$=30 mm, the diffraction level m=2, the grating interval d=3 μm, the grating G1 is placed on the x coordinate axis and the included angle θ between the planar detector D and the x coordinate axis is 69.3°. FIG. 10A exhibits the diffraction result of the grating G1, which is tested and derived by a ray-tracing software, Tracepro version 3.22, under these conditions. FIGS. 10B, 10C and 10D display the measuring results acquired by the detector D around 360 nm, 550 nm, and 720 nm, respectively. Thereupon, it is learned that the grating G1 reaches the resolution of 2 nm in the three wavelength ranges.

[Embodiment 2]

Figure 11B:
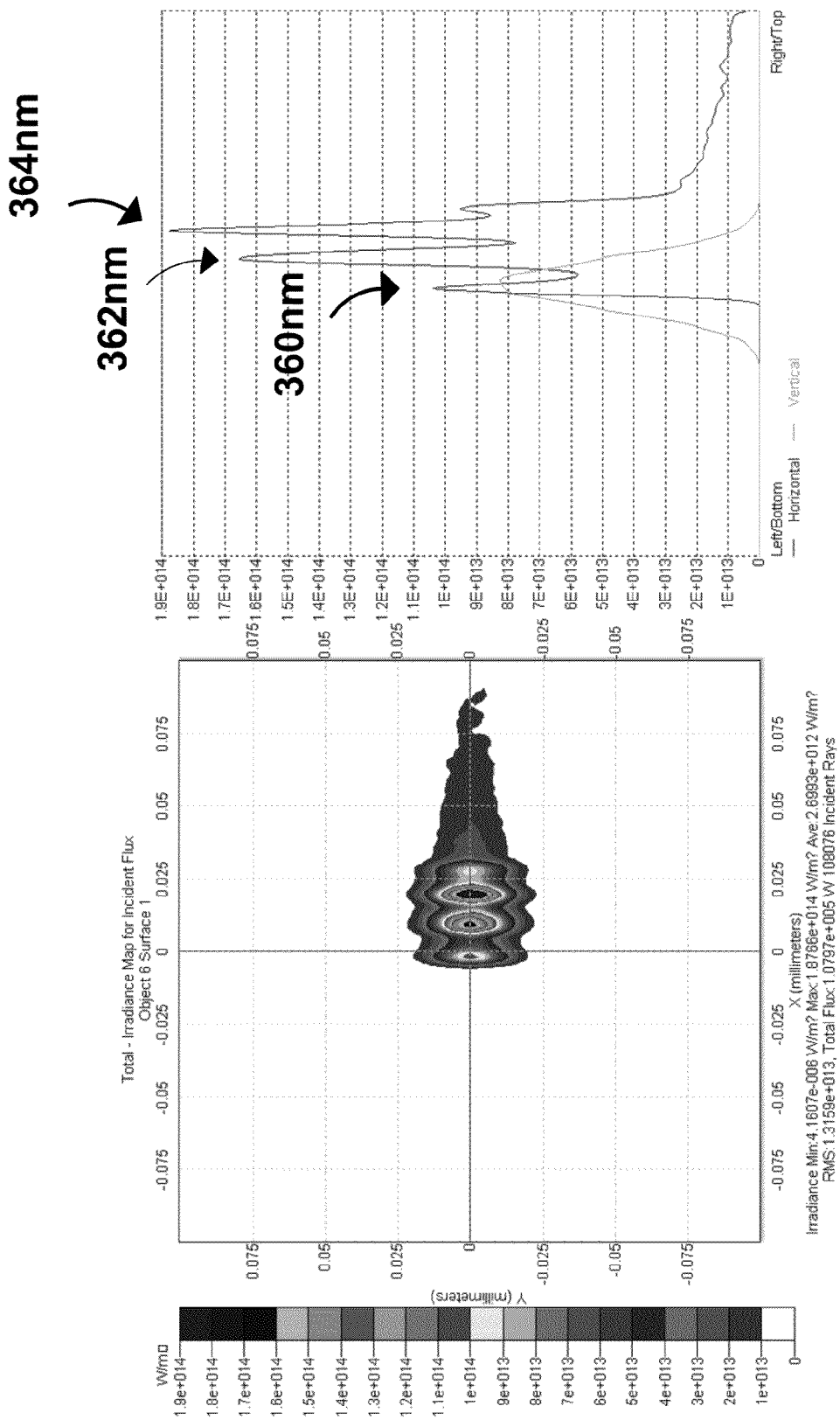
FIGS. 11B to 11D are spectrograms according to the second embodiment of the present invention.
Figure 11C:
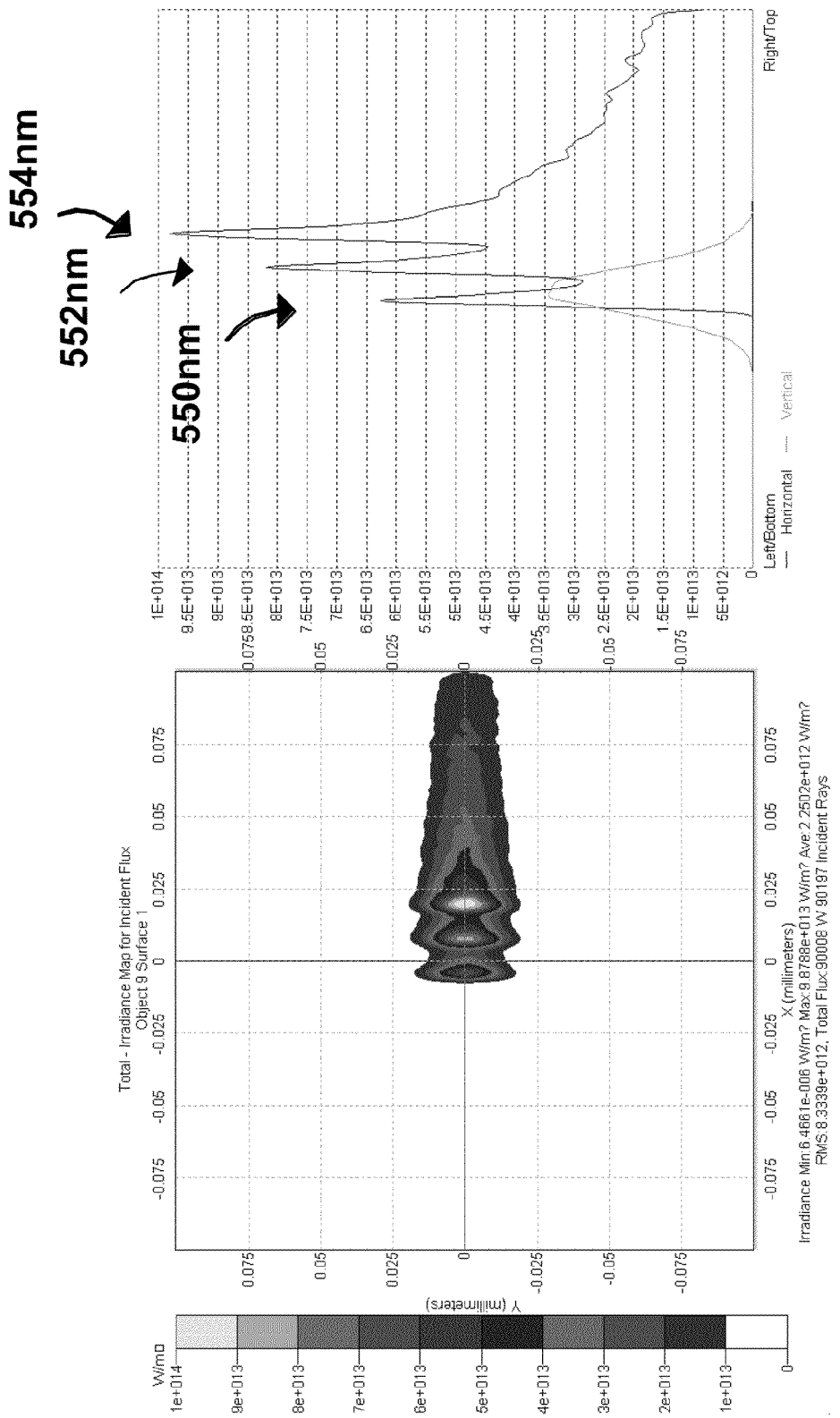
Figure 11D:
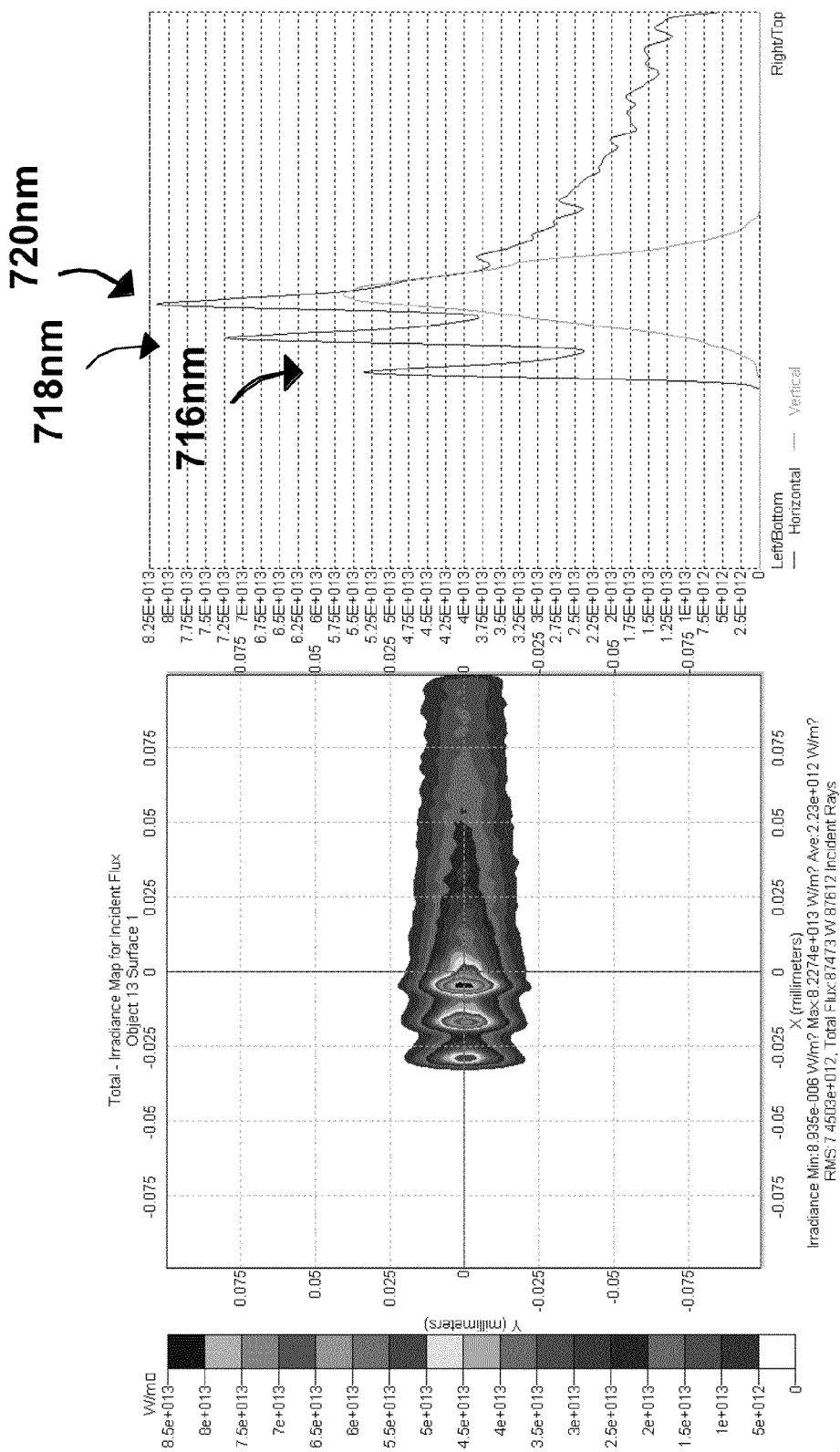

A grating G2 is provided with a profile as shown in FIG. 9. The experiment conditions are referred to FIG. 8, wherein the entrance slit width $s_1$=62.5 μm; the incident angle $α_c$=75°, the incidence arm length $r_1$=30 mm, the diffraction level m=2, the grating interval d=3 μm, the grating G2 is placed on the x coordinate axis and the included angle θ between the planar detector D and the x coordinate axis is 80.5°. FIG. 11A exhibits the diffraction result of the grating G2, which is tested and derived by the ray-tracing software, Tracepro version 3.22, under these conditions. FIGS. 11B, 11C and 11D display the measuring results acquired by the detector D around 360 nm, 550 nm, and 720 nm, respectively. Thereupon, it is learned that the grating G2 reaches the resolution of 2 nm in the three wavelength ranges.

[Embodiment 3]

Figure 12A:
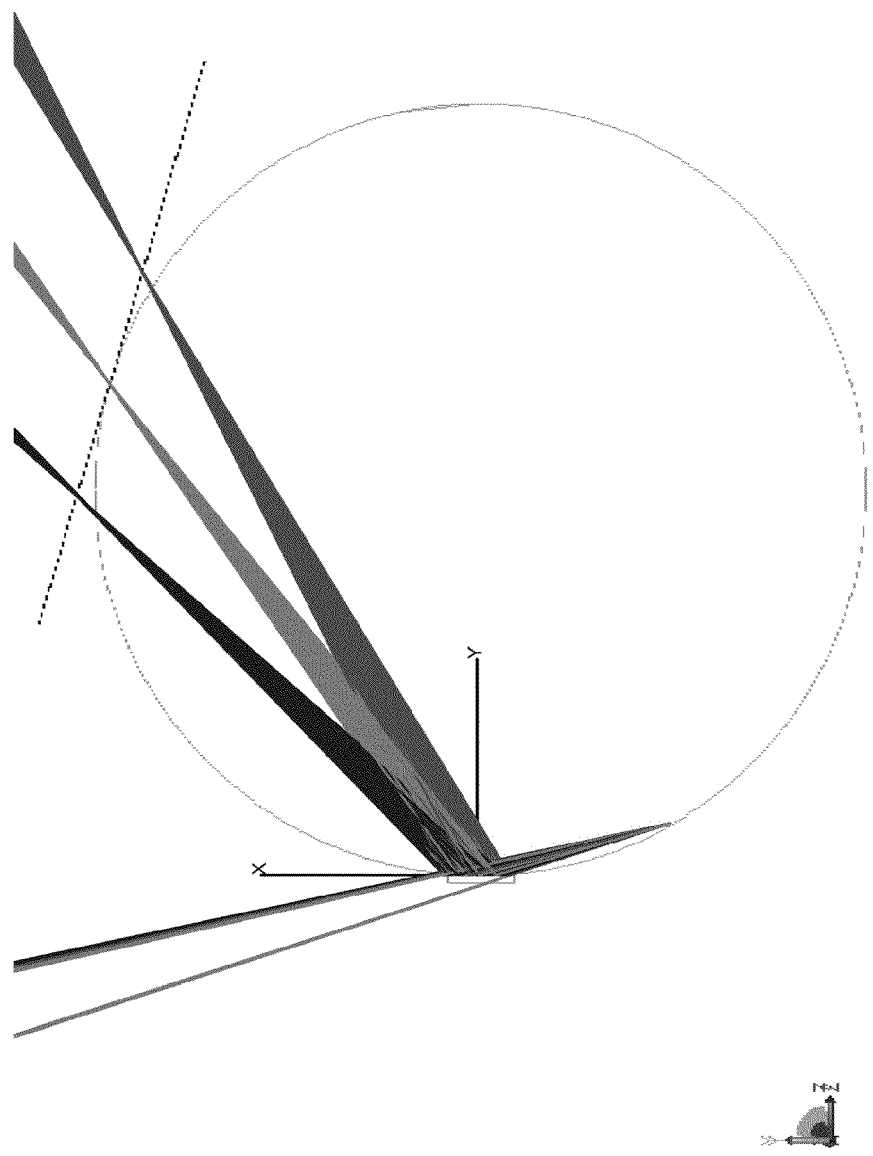
FIG. 12A is a ray-tracing diagram according to a comparative example.
Figure 12B:
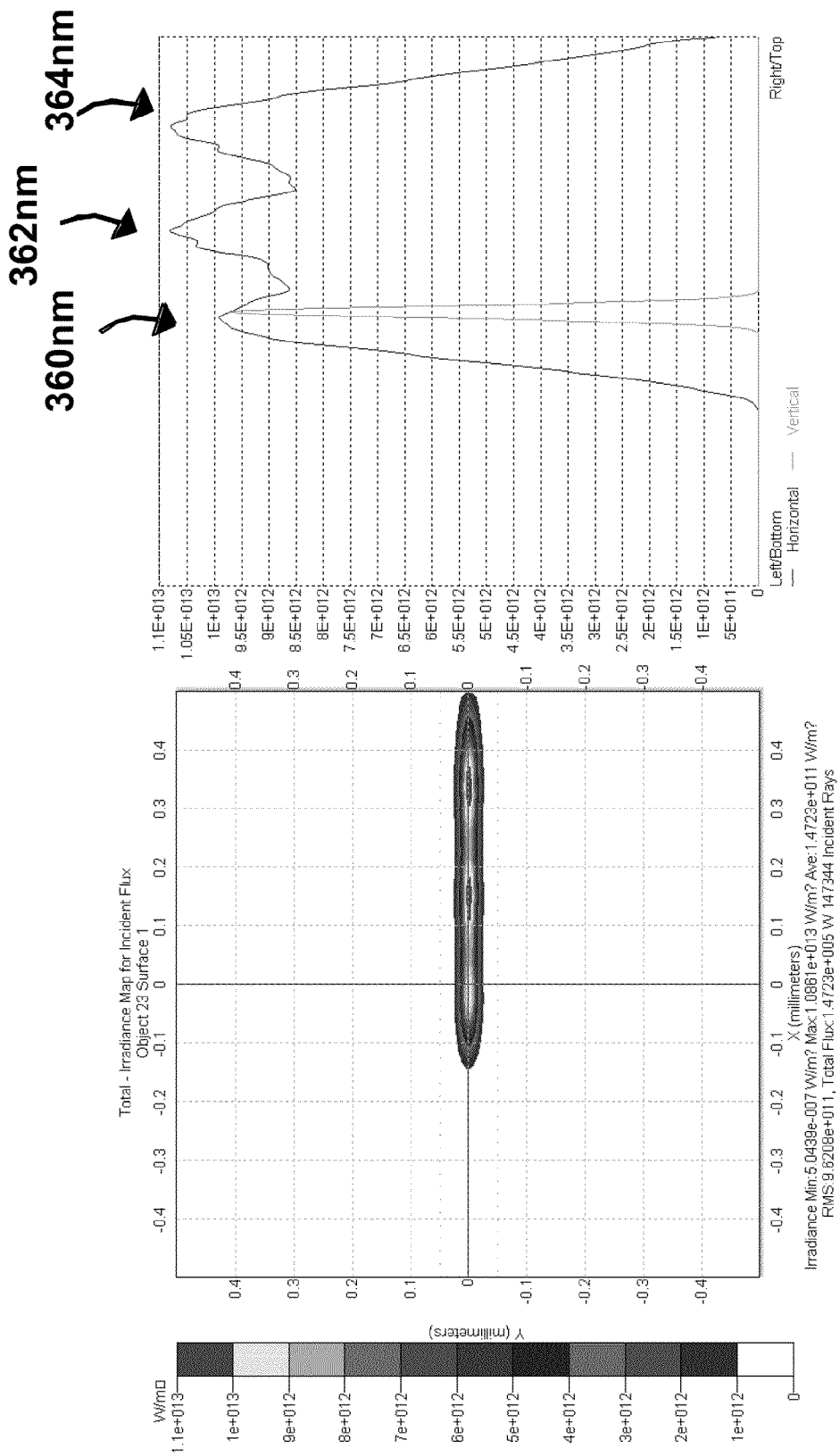
FIGS. 12B to 12D are spectrograms according to the comparative example.
Figure 12C:
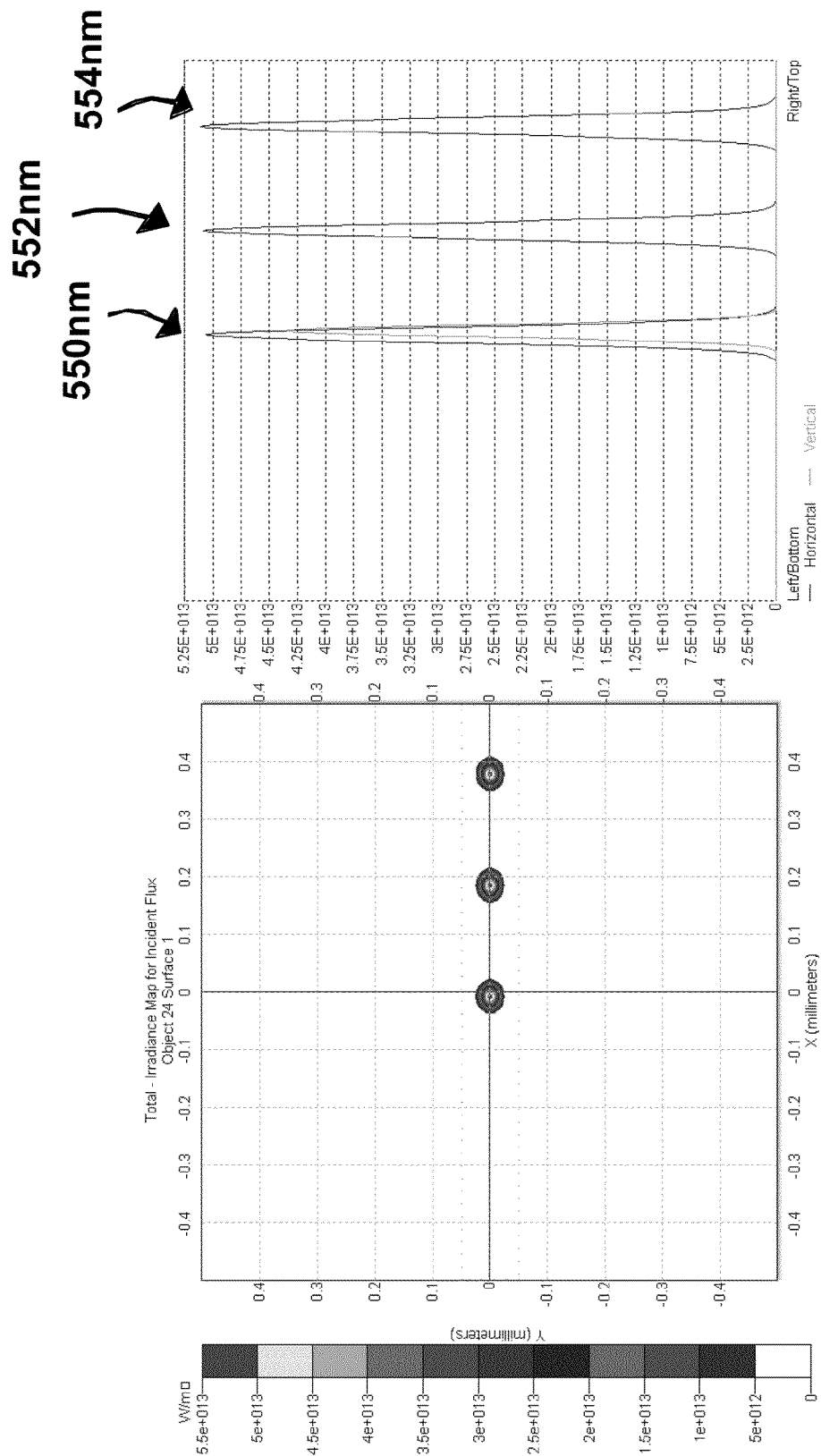
Figure 12D:
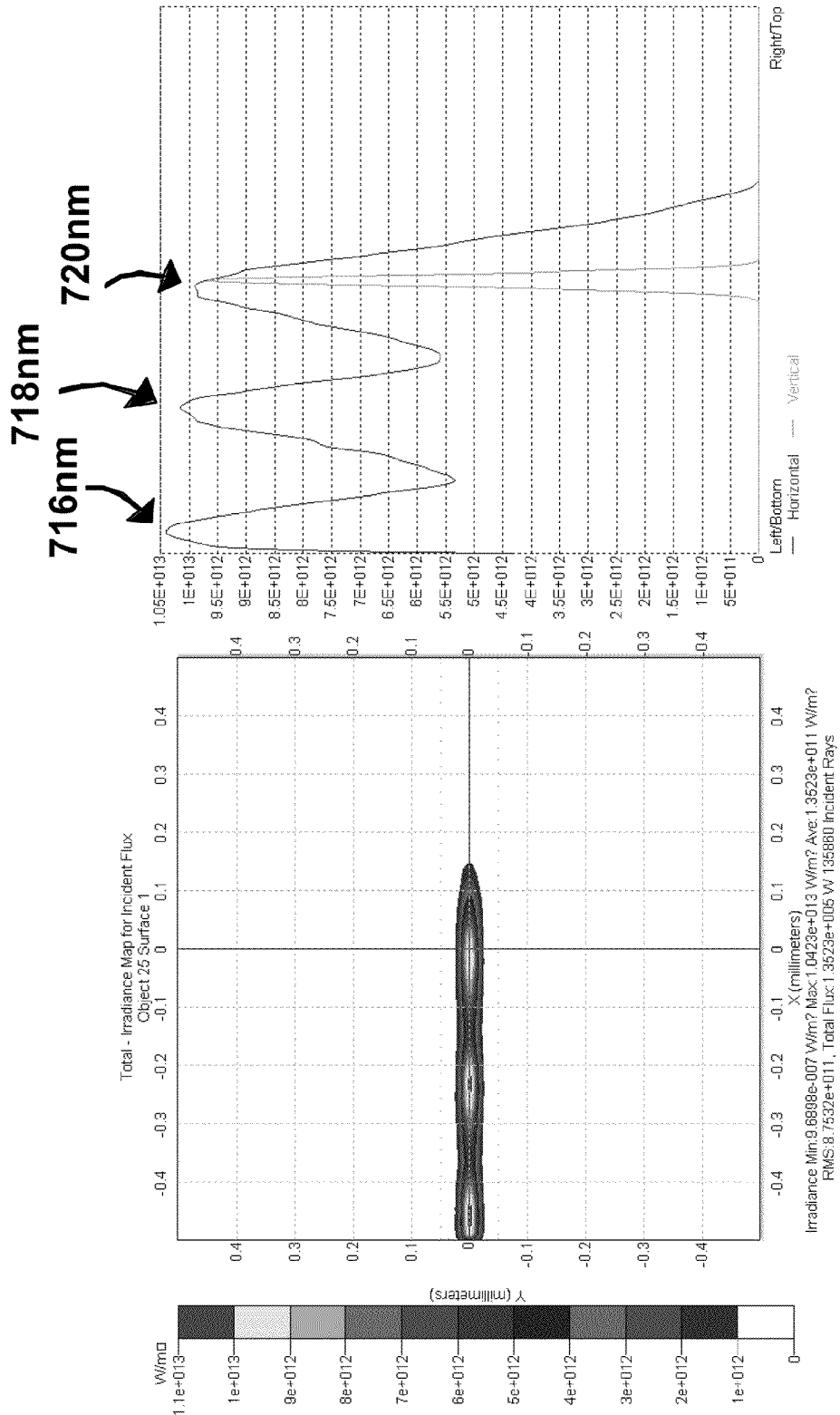

A grating G3 is provided with a profile as shown in FIG. 9 and is in accordance with the Rowland circle. The experiment conditions are referred to FIG. 8, wherein the entrance slit width $s_1$=62.5 μm, the incident angle $α_c$=75°; the incidence arm length $r_1$=30 mm, the diffraction level m=2, the grating interval d=3 μm, the grating G3 is placed on the x coordinate axis and the included angle θ between planar detector D and the x coordinate axis is 73.64°. FIG. 12A exhibits the diffraction result of the grating G3, which is tested and derived by the ray-tracing software, Tracepro version 3.22, under these conditions. The resolution measurements are as illustrated in FIGS. 12B through 12D, wherein the resolution is not satisfying at the wavelength around 360 nm, and is perfect at the wavelength around 550 nm while the resolution is merely about 4 nm at the wavelength around 720 nm.

The comparison of the experiment results is tabled as Table 1. Therein, $φ_C$ is the included angle between the detector D and the spectral component and $r_2$ is the reflection optical path length. In the Embodiments 1 and 2, the reflection optical path lengths range from 8 to 12 mm, while in the Example 3 the grating G3 of the Rowland circle requires the reflection optical path length ranging form 80 to 105 mm. The results prove that the grating of the present invention is feasible to a microminiaturized optical system without extensive space.

TABLE 1

|    | $r_2$(360 nm) | $r_2$(550 nm) | $r_2$(720 nm) | $φ_c$ |
|----|---------------|---------------|---------------|-------|
| G1 | 8.562 mm      | 10.362 mm     | 11.532 mm     | 57.52°|
| G2 | 6.099 mm      | 7.375 mm      | 8.204 mm      | 46.32°|
| G3 | 83.438 mm     | 92.793 mm     | 104.259 mm    | 53.18°|

Hence, the diffraction grating of the present invention applied to an optical system can be constructed to meet a predetermined wavelength range and is feasible to spectrology of all wavebands (including X-ray, ultraviolet, visible light and infrared). The optical system is applicable to photometry and analysis for multi-component compounds so as to acquire complete measuring data.

The disclosed diffraction grating applied to an optical system can separate optical signals into a plurality of spectral components, so as to focus the spectral components on the linear plane without the need of lengthening the optical path. The disclosed diffraction grating provides functions of dispersion and focusing, so as to supersede collimators and correcting lenses. Therefore, the number of required components in the optical system can be reduced and consequently the optical system can be microminiaturized to accommodate in a portable optical instrument.

According to one preferred embodiment of the present invention, the optical system may be configured as a microstructure through a semiconductor process. Therein, the diffraction grating may be made by a lithography electroforming micro molding process or a lithography and etching process. Thereupon, through the present invention, the high accuracy as well as the mass production can be achieved and practical, resulting in reduced manufacturing costs and durable products.

Although the particular embodiments of the invention have been described in detail for purposes of illustration, it will be understood by one of ordinary skill in the art that numerous variations will be possible to the disclosed embodiments within the scope of the invention as disclosed in the claims.

What is claimed is:

1. An optical system, comprising:
an input, for receiving an optical signal;
a predetermined output plane having a surface with a geometric shape that is not part of a Rowland circle; and
a diffraction grating, the diffraction grating being a freeform type grating and being neither a holographic type grating nor a ruling type grating, the diffraction grating having a freeform diffraction surface with a first profile corresponding to the predetermined output plane, the freeform diffraction surface formed by a photolithography process to have a freeform characteristic, the first profile having inflection points and being a freeform profile, the freeform diffraction surface configured to separate the optical signal received at the input into a plurality of spectral components, which are focused on a plurality of points of the predetermined output plane.

2. The optical system of claim 1, wherein the surface of the predetermined output plane is a flat plane.

3. The optical system of claim 1, wherein the spectral components are distributed on the predetermined output plane in accordance with a linear distribution.

4. The optical system of claim 1, wherein the spectral components are focused on more than two points of the predetermined output plane.

5. The optical system of claim 4, wherein the detector is a light detector.

6. The optical system of claim 1, further comprising at least one detector provided on the predetermined output plane for detecting the spectral components focused on the predetermined output plane.

7. The optical system of claim 1, wherein the input is a slit.

8. The optical system of claim 1, wherein the input is an end of an optical fiber.

9. The optical system of claim 1, wherein the diffraction grating is a reflective grating.

10. The optical system of claim 1, wherein the freeform diffraction surface is a substantially concave diffraction surface.

11. The optical system of claim 1, wherein the freeform diffraction surface has a second profile with a saw-toothed structure, and tops of the saw-toothed structure form the first profile.

12. An optical system, comprising:
an input, for receiving an optical signal;
a predetermined output plane having a surface with a geometric shape that is not part of a Rowland circle; and
a diffraction grating, the diffraction grating being a freeform type grating and being neither a holographic type grating nor a ruling type grating,
wherein:
the diffraction grating has a freeform diffraction surface with a first profile which is non-cylindrical and corresponding to the predetermined output plane, the freeform diffraction surface formed by a photolithography process to have a freeform characteristic, the first profile having inflection points and being a freeform profile, the freeform diffraction surface configured to separate the optical signal received at the input into a plurality of spectral components,
each spectral component includes a plurality of rays,
the predetermined output plane has a plurality of specific points corresponding to the spectral components respectively, and different sections of the diffraction grating have different types of diffraction each of which based on a different equation to cause the rays incident on the different sections of the diffraction grating to be focused on the specific points.

13. The optical system of claim 12, wherein the surface of the predetermined output plane is a flat plane.

14. The optical system of claim 12, wherein the spectral components are focused on more than two points of the predetermined output plane.

15. The optical system of claim 12, wherein a second profile with a periodic structure is formed on the diffraction surface and tops of the periodic structure form the first profile.

16. The optical system of claim 15, wherein the periodic structure is a saw-toothed structure.

17. The optical system of claim 16, wherein the tops of teeth of the saw-toothed structure have a fixed inclined angle.

18. The optical system of claim 12, wherein the predetermined output plane is obtained according to a maximum resolving wavelength, a minimum resolving wavelength, and a diffraction order.

19. A manufacturing method of an optical system comprising:
providing an input for receiving an optical signal;
providing a substrate;
forming a freeform diffraction surface on the substrate by a photolithography process so as to form a diffraction grating, the diffraction grating being a freeform type grating and being neither a holographic type grating nor a ruling type grating, the freeform diffraction surface corresponding to a predetermined output plane having a surface with a geometric shape that is not part of a Rowland circle, wherein the freeform diffraction surface includes a first profile having inflection points and being a freeform profile; and
configuring the freeform diffraction surface to separate the optical signal received at the input into a plurality of spectral components, which are focused on a plurality of points of the predetermined output plane.

20. The manufacturing method of the optical system of claim 19, wherein the freeform diffraction surface includes:
a second profile with a saw-toothed structure, wherein tops of the saw-toothed structure form the first profile.

* * * * *